(12) United States Patent
John et al.

(10) Patent No.: US 12,440,779 B2
(45) Date of Patent: Oct. 14, 2025

(54) SYSTEM AND METHOD FOR DYNAMIC OPTIMIZATION OF A CRUDE DISTILLATION UNIT

(71) Applicant: BHARAT PETROLEUM CORPORATION LTD., Maharashtra (IN)

(72) Inventors: Mathew John, Maharashtra (IN); Rajeev Kumar, Maharashtra (IN); Ravi Kumar Voolapalli, Maharashtra (IN)

(73) Assignee: BHARAT PETROLEUM CORPORATION LTD., Maharashtra (IN)

( * ) Notice: Subject to any disclaimer, the term of this patent is extended or adjusted under 35 U.S.C. 154(b) by 911 days.

(21) Appl. No.: 17/675,379

(22) Filed: Feb. 18, 2022

(65) Prior Publication Data
US 2022/0266166 A1     Aug. 25, 2022

(30) Foreign Application Priority Data
Feb. 25, 2021   (IN) .............................. 202121008036

(51) Int. Cl.
  *B01D 3/42*   (2006.01)
  *G05B 15/02*  (2006.01)
  *C10G 7/12*   (2006.01)
(52) U.S. Cl.
  CPC ............... *B01D 3/42* (2013.01); *G05B 15/02* (2013.01)

(58) Field of Classification Search
  CPC ............ B01D 3/42; G05B 15/02; C10G 7/12
  USPC ............................................. 700/29
  See application file for complete search history.

(56) References Cited

U.S. PATENT DOCUMENTS

| | | |
|---|---|---|
| 5,666,297 A | 9/1997 | Britt et al. |
| 9,268,326 B2 | 2/2016 | Treiber et al. |
| 2019/0179271 A1 | 6/2019 | Modi et al. |
| 2022/0373530 A1* | 11/2022 | Premanadhan ........ G01N 11/04 |

* cited by examiner

*Primary Examiner* — Michael J Brown
(74) *Attorney, Agent, or Firm* — D'Ambrosio & Menon, PLLC; Usha Menon

(57) ABSTRACT

The present invention relates to a system and method for real-time dynamic optimization of crude distillation unit (CDU). The present invention makes use of a combination of CDU and plant data such as crude density, flow, temperature profile and pressure profile of column, other operating conditions, and column heat balance to calculate product yields and product properties. The present invention makes use of real-time CDU or plant measurements, and its non-linear time-dependent functions to represent change in feedstock (product) characteristics, and predict the optimal value of CDU input data to optimize the CDU, and product yields and product properties. This provides a robust optimized solution that significantly reduces the computational time, accounts for dynamic change in crude composition and the unsteady nature of the operation during crude transitions.

13 Claims, 13 Drawing Sheets

SYSTEM AND METHOD FOR DYNAMIC OPTIMIZATION OF A CRUDE DISTILLATION UNIT

CROSS REFERENCE TO RELATED APPLICATION(S)

This application is related to and claims priority to Indian Patent Application No. 202121008036 filed on Feb. 25, 2021, the contents of which are incorporated by reference herein.

TECHNICAL FIELD

The present disclosure relates to the field of crude distillation units, and more particularly the present disclosure relates to a system and method that use real-time plant data and its non-linear time-dependent functions to represent the change in feedstock, for dynamic optimization of operating conditions to maximize profit and meet the desired product quality constraints.

BACKGROUND

Background description includes information that may be useful in understanding the present invention. It is not an admission that any of the information provided herein is prior art or relevant to the presently claimed invention, or that any publication specifically or implicitly referenced is prior art.

Crude distillation unit (CDU) is an energy-intensive refining process. Most of the refiners rely on advanced process control (APC) and steady-state real-time optimization (RTO) tools to maximize the profit for the CDU system by adjusting the values of key decision variables while meeting product specifications and plant feasibility constraints. However, drastic changes in crude composition significantly reduce APC performance and is typically switched off during crude switch operations. Also, stratification of raw crude oil into layers in the large tank farm sections causes severe operating problems in terms of the stability of the column. In absence of online measurement for crude True Boiling Point (TBP), the first principles-based optimization model cannot be used directly for dynamic or steady-state closed-loop real-time optimization (RTO). This leads to significant loss of revenue during feedstock transition as a result of producing off-spec products and giveaway more valuable products.

Darby et al. reviewed current RTO practices and conclude that a fundamental limiting factor of RTO implementation is the steady-state wait-time. In practice, large complex plants such as refineries are hardly ever at steady-state, so a 'steady-state' assumption needs to be made within a suitable margin of error once a near-steady-state operation has been detected. Such steady-state detection is not only in itself a complex and error-prone task; the requirement for 'steady-state' limits the application of RTO systems to times when the plant can reasonably assume to be at steady-state, meaning that the RTO may not be viable for a high proportion of the time, particularly for refineries with frequent crude changeovers. Furthermore, the margin of error used for the steady-state assumption immediately introduces an element of sub-optimality. These factors severely limit the effectiveness of currently available tools in optimizing steady-state operation. More seriously, they provide no capabilities for the all-important optimization of the transition economics.

Campos et al. state that one of the main challenges with dynamic optimization is the need for large computational power and time RTO often involves optimization of large-scale systems with a large number of variables. This results in large nonlinear programming problems. Additionally, in dynamic optimization problems, the size of the problem increases significantly due to the additional dimension of time. As a result, dynamic optimization problems may be significantly more computationally demanding to solve than their static counterpart. The computational delay may impose limitations on how often the optimal setpoints can be updated. Findeisen and Allgöwer, 2004 claimed that the computational delay may even lead to performance degradation or closed-loop instabilities.

The U.S. Pat. No. 5,666,297 describes a software system that uses equipment models in a first mode to simulate and optimizes a process plant. The system first uses a sequential modular simulation routine to get an initial set of operating parameters and followed by optimization using equation oriented which simultaneously optimizes the operating variables. This system is suited for steady-state mode optimization but is not suited for dynamic optimization, and the use of first equipment models involves higher computational time.

Another U.S. Pat. No. 9,268,326B2 presents computer apparatus and method for steady-state real-time multi-unit optimization. The cited document uses a first principles-based steady-state model of a plant along with a non-linear optimizer to calculate the optimum operating condition. This invention applies only to systems operating at steady-state, however, they are not suitable for dynamic optimization of the plant.

Yet another United States Patent Application No. US20190179271A1 discloses a method and system for configuring and re-calibrating a first principle model to an operation-centric model suitable for online deployment to monitor, predict, and control real-time plant operations. The method provides an option for the dynamic construction of the operation centric model that may reduce the computational time. However, the validity of the model for dynamic optimization is not established. Furthermore, this method does not provide the means to handle uncertainty in feed composition when the base feed composition details are not available.

In addition, Friedman made use of heat balance across the crude fractionator to predict two points on the equilibrium flash vaporization (EFV) curve. These EFV temperatures were converted into two points on the feed TBP curve using a standard correlation. However, standard methods to convert EFV to TBP are not accurate enough. Also, they do not accommodate the column parameters, hence cannot be used in on-line application.

There is, therefore, a need to overcome the above drawback, shortcomings, and limitations, and provide an efficient, robust, and optimized solution for dynamic optimization of a crude distillation unit, which significantly reduces the computational time, and accounts for dynamic change in crude composition and unsteady nature of the operation during crude transitions.

OBJECTS OF THE PRESENT DISCLOSURE

Some of the objects of the present disclosure, which at least one embodiment herein satisfies are as listed herein below.

It is an object of the present disclosure to provide an efficient, accurate, fast, and robust system and method for dynamic optimization of a crude distillation unit.

It is an object of the present disclosure to provide an efficient, accurate, fast, and robust system and method for dynamic prediction of plant yields and product characteristics based on crude column operating conditions.

It is an object of the present disclosure to provide a system and method for dynamic optimization of crude distillation unit, without requiring or depending on the crude assay, TBP, laboratory analyzers, and composition details of crude.

It is an object of the present disclosure to determine thermal property, heat balance, and plant yield of a crude distillation unit.

It is an object of the present disclosure to recondition, cleanse or reconcile received plant data or parameters, for real-time dynamic optimization of crude distillation unit and model training application.

It is an object of the present disclosure to reduce computational time for dynamic optimization of a crude distillation unit, and dynamic prediction of plant yields and product characteristics.

It is an object of the present disclosure to provide a system and method for dynamic optimization of crude distillation unit that accounts for dynamic change in crude composition and unsteady nature of the operation during crude transitions.

It is an object of the present disclosure to train autoregressive exogenous models and training methods associated with the dynamic optimization system and method to select an optimal number of time step delays/steps for the model.

It is an object of the present disclosure to provide a system and method for dynamic optimization of crude distillation unit that adapts the autoregressive exogenous models and training method by fine-tuning model parameters if the accuracy of the model is not within an acceptable range.

SUMMARY

The present disclosure relates to a system and method that use real-time plant data and its non-linear time-dependent functions to represent the change in the feedstock or product, for dynamic optimization of operating conditions to maximize profit and meet the desired product quality constraints.

An aspect of the present disclosure pertains to a system for dynamic optimization of a crude distillation unit (CDU). The CDU can include a set of sensors positioned at predefined positions in the crude distillation unit and associated plant, which may be configured to monitor parameters or input data associated with the CDU and the plant, and correspondingly generate a first set of signals. The proposed system may further comprise a processing unit in communication with the set of sensors and a control unit associated with the CDU and the plant. The processing unit may be configured with a neural network model, and comprising one or more processors operatively coupled with a memory storing instructions executable by the one or more processors, to receive the monitored plant data or parameters, and correspondingly dynamically optimize the CDU or plant, and dynamically predict the plant yields and product characteristics.

Another aspect of the present disclosure pertains to a method for dynamic optimization of the CDU. The method may involve the sensors, being coupled at predefined positions in the CDU to monitor parameters or input data associated with the CDU and the plant. The method may also involve the processing unit, which can be configured to receive the monitored parameters or variables associated with the CDU or plant, and correspondingly enable dynamic optimization of the CDU.

In an aspect, based on the determined optimal values of plant inputs or optimum steps, determined by the processing unit, the processing unit may accordingly enable the control unit of the CDU to select the optimum plant inputs for optimum plant yield and product characteristics. In another aspect, based on the optimal values of plant inputs or optimum steps, determined by the processing unit, the processing unit may accordingly send the determined optimal values of plant inputs to the dashboard or server, which allows the user at the CDU to accordingly control the input inputs for optimum plant yield and product characteristics.

In an aspect, the processing unit may be configured to recondition, cleanse or reconcile received plant data or parameters, for real-time dynamic optimization of crude distillation unit and for model training application of the proposed system and method, which may restrict or filter bad data and replace them with mass-energy consistent data, for efficient, accurate, and fast computation of optimal input plant data as well as the corresponding plant yields and product characteristics.

The proposed system and method may directly address the challenges associated with dynamic optimization. The challenge associated with uncertainty in the crude composition may be addressed by using the measured column profile itself as an indicator for crude feedstock changes. Further, advanced data-driven statistical and neural network/machine learning models may be used to capture non-linear relations between CDU distillate yields, draw temperatures, and product properties. Thus, the proposed system and method may provide a robust optimized solution, significantly reduces the computational time, and accounts for dynamic change in crude composition, and the unsteady nature of the operation during crude transitions.

Various objects, features, aspects, and advantages of the inventive subject matter will become more apparent from the following detailed description of preferred embodiments, along with the accompanying drawing figures in which numerals represent like components.

BRIEF DESCRIPTION OF DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure. The diagrams are for illustration only, which thus is not a limitation of the present disclosure.

In the figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1A:
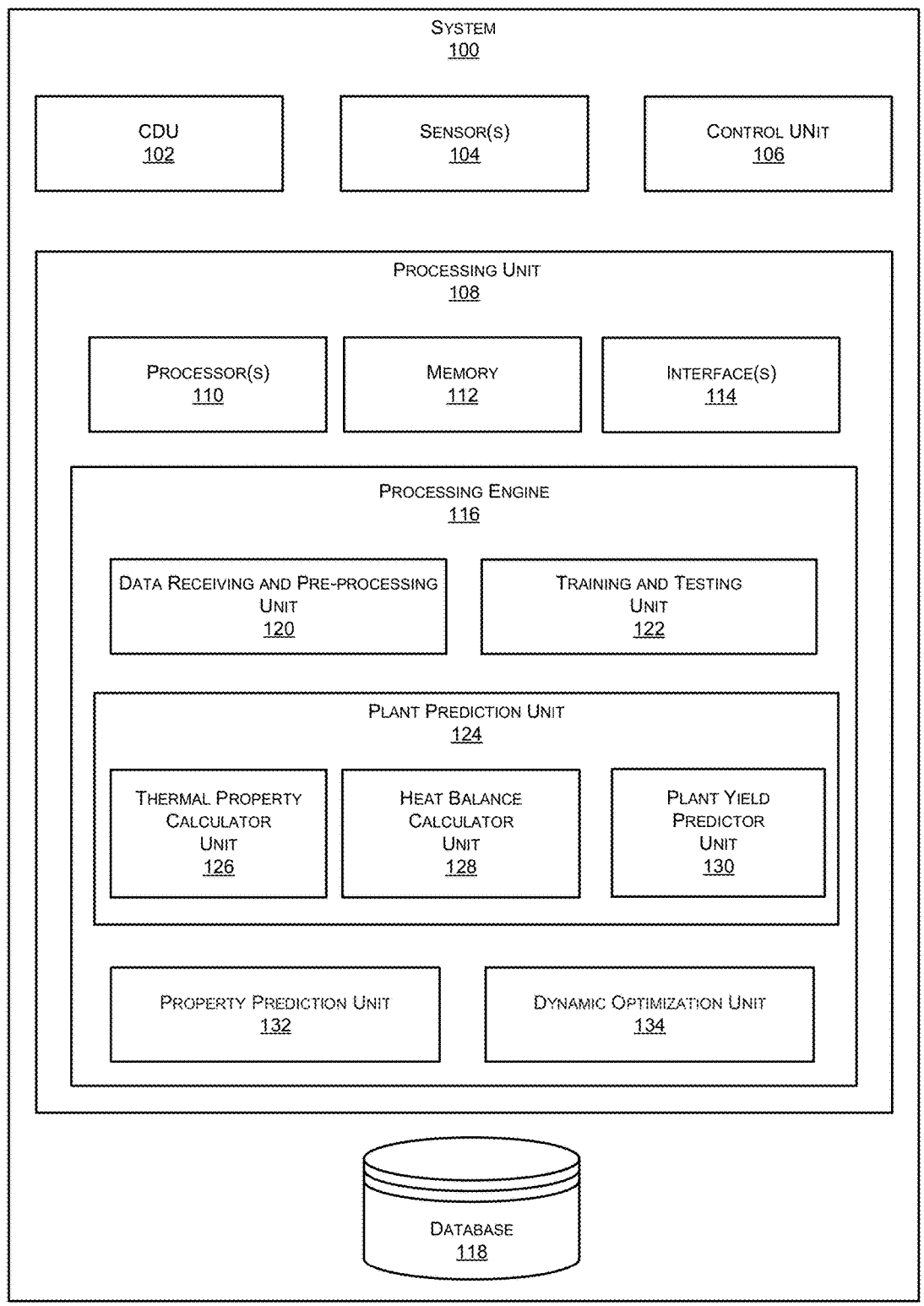
FIG. 1A illustrates an exemplary architecture of the proposed system for dynamic optimization of crude distillation unit, in accordance with an embodiment of the present disclosure.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

In the following description, numerous specific details are set forth in order to provide a thorough understanding of embodiments of the present invention. It will be apparent to one skilled in the art that embodiments of the present invention may be practiced without some of these specific details.

The present disclosure relates to a system and method that use real-time plant data and its non-linear time-dependent functions to represent the change in the feedstock, for dynamic optimization of operating conditions to maximize profit and meet the desired product quality constraints.

According to an aspect, the present disclosure elaborates upon a system for dynamic optimization of a crude distillation unit (CDU). The system can include a set of sensors positioned at predefined positions in the crude distillation unit and associated plant, the set of sensors configured to monitor one or more parameters associated with the CDU and the plant, and correspondingly generate a first set of signals. The system can further include a processing unit in communication with the set of sensors, wherein the processing unit can be configured with a neural network model, and comprising one or more processors operatively coupled with a memory storing instructions executable by the one or more processors, and configured to receive the generated first set of signals from the set of sensors at pre-defined time steps; extract a set of input parameters, a set of output parameters from the received first set of signals; calculate, using an autoregressive exogenous time dependent model, thermal property, heat balance, and product yield of the CDU for each of the pre-defined time steps, based on the extracted set of input parameters, and correspondingly generate a first set of data packets; train and test, the neural network model and the autoregressive exogenous time dependent model, using any or a combination of the extracted set of input parameters, and set of output parameters, and the generated first set of data packets, to determine an optimal value of the pre-defined time steps for subsequent receipt of the first set of signals from the set of sensors; and determine optimum values of the set of input parameters, and the corresponding set of output parameters of the CDU for a predefined time, based on the set of input parameters, and the corresponding set of output parameters received at real-time, and at previous optimal time steps.

In an embodiment, the set of input parameters can include a first set of input parameters selected from temperature of draw furnace outlet, pumparound return temperature, temperature profile of a distillation column of the CDU, pressure profile of the distillation column, and temperature and pressure of flash zone; and a second set of input parameters selected from steam flow rate, stream draw temperature, pumparound flow rate, crude flow rate, crude density, crude specific gravity (S.G), volatility of crude, and fraction of crude vaporized (Vf), but not limited to the likes. The set of output parameters can include any or a combination of composition, characteristics, and flow rate of one or more products of the CDU, but not limited to the likes.

In an embodiment, the thermal property can include hydrocarbon stream thermal properties selected from the heat of vaporization, and specific heat capacity, which can be calculated by the processing unit based on the crude specific gravity, and stream draw temperature. Further, the heat balance of the CDU can be calculated in real-time, and at each of the pre-defined time steps, based on the calculated thermal property and the extracted set of input parameters, which can facilitate the processing unit to calculate the volatility of crude, and the fraction of crude vaporized (Vf).

In an embodiment, when the extracted set of input parameters is beyond a pre-set range of a training data set of the neural network model, the processing unit can be configured to adjust one or more hyper parameters associated with the neural network model until the set of output parameters calculated by the processing unit matches the real-time value of the set of output parameters of the CDU.

In an embodiment, the processing unit can be configured to adjust one or more hyper parameters associated with the neural network model to train and test the neural network model and the autoregressive exogenous time-dependent model, using any or a combination of the extracted set of input parameters, and set of output parameters, and the generated first set of data packets until the set of output parameters calculated by the processing unit matches the real-time value of the set of output parameters in the CDU.

In an embodiment, the processing unit can be configured to determine product stream quality indicators comprising ASTM D86, D1160 distillation points, flash and freeze point, for the predefined time, based on the set of input parameters, and the corresponding set of output parameters received at real-time, and the previous optimal time steps.

In an embodiment, the processing unit can be configured with a set of filters selected from a Savitzky-Golay filter, and a Moving Point Averaging filter to filter and restrict use of the set of inputs parameters having any or a combination of a negative value, zero value, and non-numerical value, in the autoregressive exogenous time-dependent model. Further, the processing unit can be configured to replace the restricted set of input parameters with another set of input parameters that are mass-energy consistent.

In an embodiment, the processing unit can be operatively coupled to a control unit of the CDU, and wherein the processing unit is configured to transmit a set of control signals to the control unit to adjust the set of input parameters of the CDU based on the determined optimum values of the set of input parameters, to enable the CDU to achieve the corresponding optimal set of output parameters at the predefined time.

According to another aspect, the present disclosure elaborates upon a method for dynamic optimization of a crude distillation unit. The method can include the steps of monitoring, by a set of sensors configured with the CDU and an associated plant, one or more parameters associated with the CDU and the plant, and correspondingly generating a first set of signals; receiving, by a processing unit configured with a neural network model, the generated first set of signals from the one or more sensors at pre-defined time steps; extracting, by the processing unit, a set of input parameters, a set of output parameters from the received first set of signals; calculating, using an autoregressive exogenous time dependent model associated with the processing unit, thermal property, heat balance, and product yield of the CDU for each of the pre-defined time steps, based on the extracted set of input parameters, and correspondingly generating a first set of data packets; training and testing, the neural network model and the autoregressive exogenous time dependent model, using any or a combination of the extracted set of input parameters, and set of output parameters, and the generated first set of data packets, to determine an optimal value of the pre-defined time steps for subsequent receipt of the first set of signals; and determining, by the processing unit, optimum values of the set of set of input parameters, and the corresponding output parameters of the CDU for a predefined time, based on the set of input parameters, and the corresponding set of output parameters received at real-time, and the previous optimal time steps.

In an embodiment, the method can include the step of filtering and restricting, by a set of filters selected from a Savitzky-Golay filter, and a Moving Point Averaging filter, the use of the set of inputs parameters having any or a combination of a negative value, zero value, and non-numerical value, in the autoregressive exogenous time-dependent model. In another embodiment, the processing unit can be configured to replace the restricted set of input parameters with another set of input parameters that are mas-energy consistent.

In an embodiment, the method can include the step of adjusting, by the processing unit, one or more hyper parameters associated with the neural network model to train and test the neural network model and the autoregressive exogenous time-dependent model, using any or a combination of the extracted set of input parameters, and set of output parameters, and the generated first set of data packets, until the set of output parameters calculated by the processing unit matches the real-time value of the set of output parameters in the CDU.

In an embodiment, when the extracted set of input parameters is beyond a pre-set range of a training data set of the neural network, the method can further include the step of adjusting, by the processing unit, one or more hyper parameters associated with the neural network model until the set of output parameters calculated by the processing unit matches the real-time value of the set of output parameters in the CDU.

The present invention uses plant (CDU) and/or simulated data to train autoregressive exogenous and time delay neural network/machine learning models. It discloses the system and method to select the optimum time delay, a method to build a model based on process simulation and plant data, and a method to check model adequacy and update the model using online dynamic plant data.

Figure 1B:
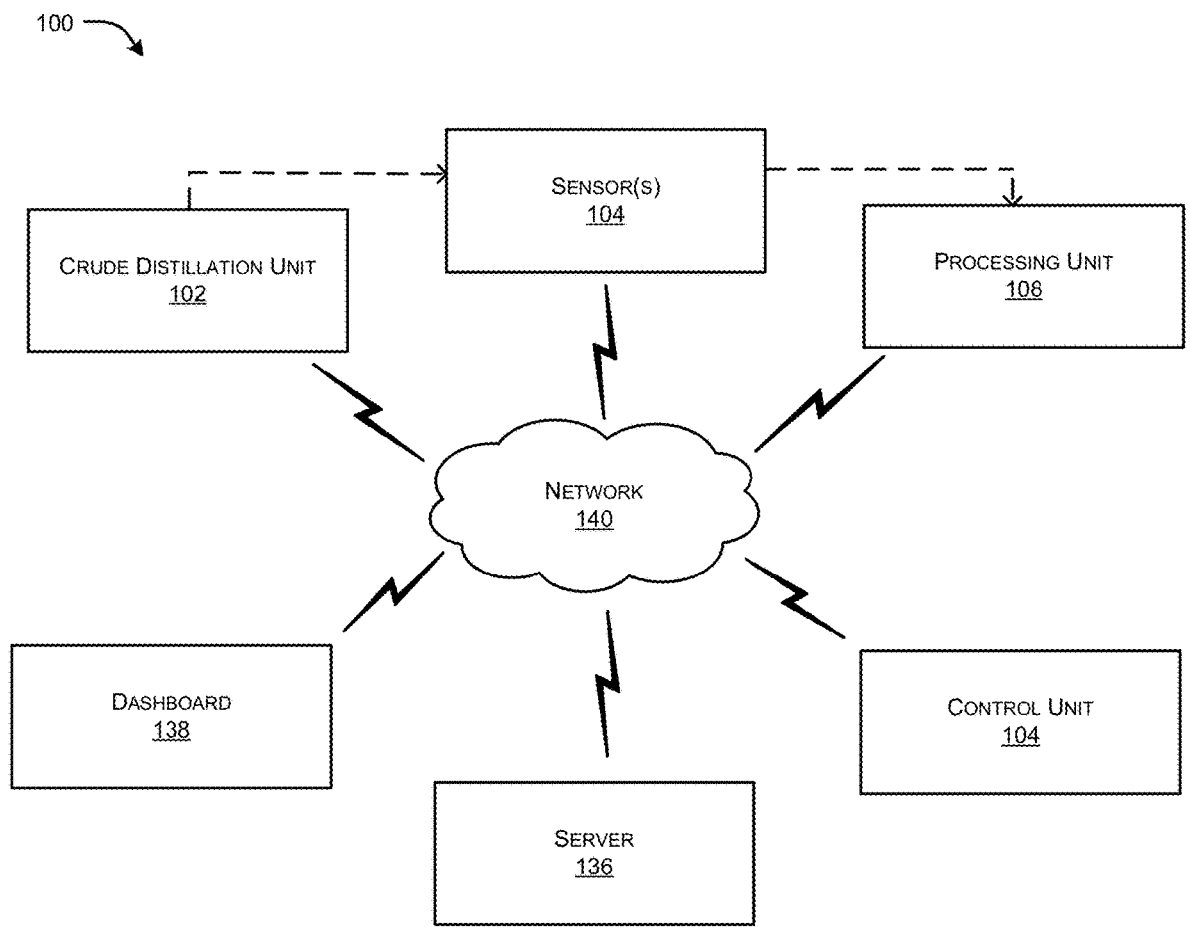
FIG. 1B illustrates an exemplary network architecture of the proposed system, in accordance with an embodiment of the present disclosure

Referring to FIGS. 1A and 1B, according to an aspect, the proposed system 100 for dynamic optimization of crude distillation unit 102 (also referred to as CDU 102 herein) is disclosed. The system 100 can include one or more sensors 104 (also referred to as sensors 104, herein) being coupled at predefined positions in the CDU 102 and a corresponding plant, to monitor one or more parameters or variables or plant measurements associated with the CDU as well as the plant. The sensors 104 can be in communication with a processing unit 108, which can be configured to receive the monitored parameters or variables or plant data associated with the CDU 102 and plant, and correspondingly dynamically optimize the CDU 102 or plant, and dynamically predict the plant yields and product characteristics. As illustrated, the processing unit 108 can further be in communication with an advanced process control or distillation column control (collectively designated as a control unit 106, herein) of the CDU 102, and a server 138, and dashboard, 138 through a network 140. System 100 can allow users or automated machinery at the control unit 106, the CDU 102, server 136, or dashboard 138, to communicate with one another, through the network 140.

Figure 2A:
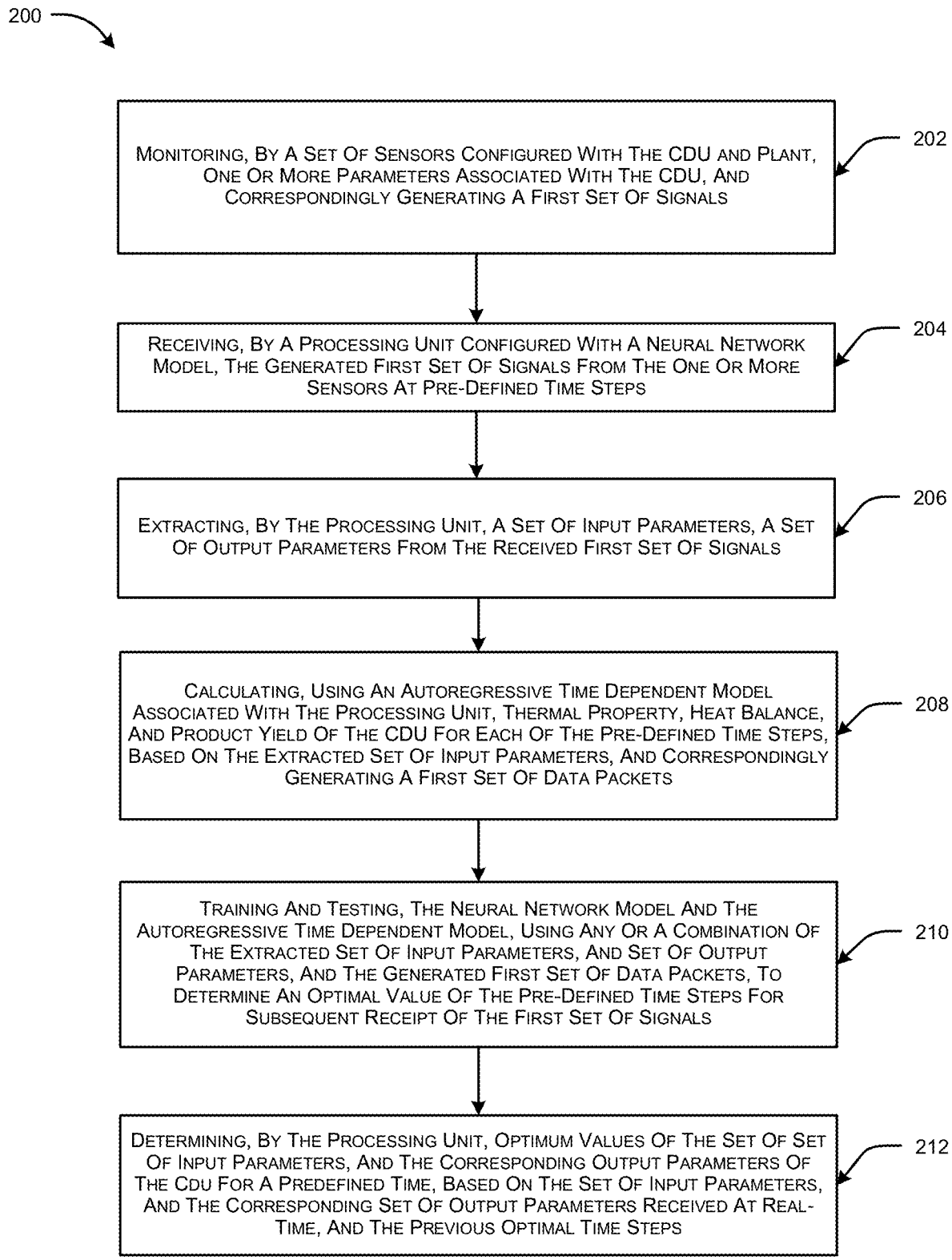
FIG. 2A illustrates an exemplary flow diagram of the proposed method for dynamic optimization of crude distillation unit, in accordance with an embodiment of the present disclosure

Referring to FIG. 2A. according to another aspect, the proposed method 200 for dynamic optimization of the CDU 102 or plant is disclosed. Method 200 can involve the sensors 104, being coupled at predefined positions in the CDU 102 and the corresponding plant to monitor one or more parameters or variables or plant measurements associated with the CDU 102 and the plant. Method 200 can also involve the processing unit 108, which can be configured to receive the monitored parameters or variables associated with the CDU 102 or plant, and correspondingly enable dynamic optimization of the CDU 102, and dynamic prediction of plant yields and product characteristics.

In an embodiment, method 200 can include step 202 of monitoring, by the sensors 104, one or more parameters or plant measurements associated with the CDU and the plant, and correspondingly generating a first set of signals. Method 200 can further include step 204 of receiving, by the processing unit 108 configured with a neural network model, the first set of signals generated in step 202, at pre-defined time steps. Method 200 can further include step 206 of extracting, by the processing unit 108, a set of input parameters, and a set of output parameters from the first set of signals received at step 204. Method 200 can further include step 208 of calculating, using an autoregressive exogenous time-dependent model associated with the processing unit 108, thermal property, heat balance, and product yield for each of the pre-defined time steps, based on the set of input parameters extracted in step 206, and correspondingly generating a first set of data packets. Method 200 can further include step 210 of training and testing, the neural network model and the autoregressive time-exogenous dependent model, using any or a combination of the set of input parameters extracted in step 206, and the set of output parameters, and the first set of data packets generated in step 208, to determine an optimal value of the pre-defined time steps for subsequent receipt of the first set of signals. Furthermore, method 200 can further include step 212 of determining, by the processing unit 108, optimum values of the set of input parameters, and the corresponding output parameters of the CDU for a predefined time 't+n', based on the set of input parameters, and the corresponding set of output parameters received at real-time 't', and the previous optimal time steps 't−n'.

In an embodiment, based on the optimal values of plant inputs or optimum steps, determined by the processing unit 108 using the proposed method 200 and system 100, the processing unit 100 can accordingly enable the control unit 106 of the CDU 102 to select the optimum plant inputs for optimum plant yield and product characteristics. In another embodiment, based on the optimal values of plant inputs or optimum steps, determined by the processing unit 108, the processing unit 108 can accordingly send the determined optimal values of plant inputs to the dashboard 138 or server 136, which allows users or operators at the CDU 102 or plant to accordingly control the input parameters or variables for optimum plant yield and product characteristics.

In an embodiment, the proposed system 100 and the proposed method 200 can be implemented using any or a combination of hardware components and software components such as a cloud, a server, a computing system, a computing device, a network device, and the like. Further, system 100 and the processing unit 102 for the proposed method 200 can interact with the users or operators at the CDU or control unit 106 or dashboard 128, through a mobile application or software that can reside in the mobile devices, or computing devices of the users or at the dashboard 138. In an implementation, the system 100 can be accessed by an application that can be configured with any operating system, including but not limited to, Android™, iOS™, Windows, and the like. It will be understood that the system or method may be implemented as any suitable computing system known in the art, such as a desktop, a laptop, a server, web server, and the like Further, network 140 can be a wireless network, a wired network or a combination thereof that can be implemented as one of the different types of networks, such as Intranet, Local Area Network (LAN), Wide Area Network (WAN), Internet, and the like. Further, the network 140 can either be a dedicated network or a shared network. The shared network can represent an association of the different types of networks that can use a variety of protocols, for example, Hypertext Transfer Protocol (HTTP), Transmission Control Protocol/Internet Protocol (TCP/IP), Wireless Application Protocol (WAP), and the like.

As illustrated in FIG. 1A, an exemplary architecture of the processing unit of the proposed system 100 and method 200 for dynamic optimization of the CDU 102 is disclosed. The processing unit 108 of the proposed system 100 and method 100 can include one or more processor(s) 110. The one or more processor(s) 110 can be implemented as one or more microprocessors, microcomputers, microcontrollers, digital signal processors, central processing units, logic circuitries, and/or any devices that manipulate data based on operational instructions. Among other capabilities, one or more processor(s) 110 are configured to fetch and execute computer-readable instructions stored in a memory 112 of the processing unit. The memory 112 can store one or more computer-readable instructions or routines, which may be fetched and executed to create or share the data units over a network service. Memory 112 can include any non-transitory storage device including, for example, volatile memory such as RAM, or non-volatile memory such as EPROM, flash memory, and the like.

In an embodiment, the processing unit 108 can also include an interface(s) 114. The interface(s) 114 can include a variety of interfaces, for example, interfaces for data input and output devices referred to as I/O devices, storage devices, and the like. The interface(s) 114 can facilitate communication of the processing unit with various devices coupled to the processing unit 108. The interface(s) 114 can also provide a communication pathway for one or more components of the processing unit 108. Examples of such components include, but are not limited to, processing engine(s) and database 118. The interfaces 114 can include i) platform for communication with the plant to read real-time data/write optimum output to distributed control systems (DCS), to communicate with Advance Process Control (APC) ii) Graphical interface that allows user to feed inputs, to type/write/upload constraints, feed/product pricing details and other requirements, iii) cloud/webserver interface for computing, data hosting and sharing iv) Dashboard for depicting Key performance indicators (KPIs), depicting optimal setpoints for offline applications, v) other software and hardware interfaces, for example, interfaces for peripheral device(s), such as a keyboard, a mouse, an external memory, and a printer.

In an embodiment, the processing unit 108 can include a communication unit operatively coupled to one or more processor(s) 110. The communication unit can be configured to communicatively couple the processing unit 108 to the control unit 106, server 136, dashboard 138, or database 118. In an exemplary embodiment, the communication unit can include any or a combination of Bluetooth module, NFS Module, WIFI module, transceiver, and wired media, but not limited to the likes.

In an embodiment, the processing engine(s) 116 can be implemented as a combination of hardware and programming (for example, programmable instructions) to implement one or more functionalities of the processing engine(s) 116. In the examples described herein, such combinations of hardware and programming may be implemented in several different ways. For example, the programming for the processing engine(s) 116 can be processor-executable instructions stored on a non-transitory machine-readable storage medium, and the hardware for the processing engine(s) 116 can include a processing resource (for example, one or more processors), to execute such instructions. In the present examples, the machine-readable storage medium may store instructions that, when executed by the processing resource, implement the processing engine(s) 116. In such examples, the processing unit 108 can include the machine-readable storage medium storing the instructions and the processing resource to execute the instructions, or the machine-readable storage medium may be separate but accessible to the processing unit and the processing resource. In other examples, the processing engine(s) can be implemented by electronic circuitry. Database 118 can include data that is either stored or generated as a result of functionalities implemented by any of the components of the processing engine(s).

In an embodiment, the processing engine(s) 116 can include a data receiving and pre-processing unit 120, a training and testing unit 122, a plant prediction unit 124 comprising a thermal property calculator unit 126, heat balance calculator unit 128, and a plant yield predictor unit 130, a property prediction unit 132, a dynamic optimization unit 134, and other units (s), but not limited to the likes. The other unit(s) can implement functionalities that supplement applications or functions performed by the processing unit or the processing engine(s) 116.

The data 118 (or database 118) serves, amongst other things, as a repository for storing data processed, received and generated by one or more of the units. The data 118 may include model parameters, and hyper parameters, plant data or training data other data. The data 118 may also include data generated as a result of the execution of one or more modules or units of the processing engine 116.

In an embodiment, the data receiving and pre-processing unit 120 can enable the processing unit 108 to receive transient plant measurements or parameters of the CDU 102 and plant (monitored by the sensors) including a first set of input parameters selected from the temperature of draw furnace outlet, pumparound return temperature, temperature profile of a distillation column of the CDU, pressure profile of the distillation column, and temperature and pressure of flash zone; and a second set of input parameters selected from steam flow rate, stream draw temperature, pumparound flow rate, crude flow rate, crude density, crude specific gravity (S.G), volatility of crude, and fraction of crude vaporized (Vf), and set of output parameters comprises any or a combination of composition, characteristics, and flow rate of one or more products of the CDU, and other operating conditions which could be directly obtained online from a DCS.

The online data transfer between CDU 102 and processing unit 108 can be taken care of by interface 114 and communication unit, which may use an open platform for communication (OPC, series of standards and specifications for industrial communication). For offline studies, standard data historian is used. The use of standard OPC interface/software will be known to those skilled in the art. The processing unit 108 can also receive online/offline time-stamped laboratory data having information regarding product properties and are used for training and generating parameters for property prediction unit 132.

In an embodiment, once the data corresponding to the plant measurements or parameters of the CDU 102 and plant are received by the processing unit 108, the data receiving and pre-processing unit 120 can cleanse and reconcile any bad data by filtering and restricting the use of the set of inputs parameters having any or a combination of a negative value, zero value, and non-numerical value, for further processing or computation.

In an exemplary embodiment, a method for cleansing and reconciling can include a step of removing or replacing the set of inputs parameters or plant data having any or a combination of a negative value, zero value, and non-numerical value, with another set of mass-energy consistent input parameters. Further, the method for cleansing and reconciling can include a step to remove unwanted noise using filters such as Savitzky-Golay filter or Moving Point Averaging (post elimination of outlier data) filter. Outlier data having variation more than 3 times the standard deviation is removed. Subsequently, the filter smoothens the data and increases the precision of the data without distorting the measured signal tendency. The cleansing and reconciling method make use of least-squares-fit convolution for smoothing and computing derivatives of a set of consecutive values from the dynamic plant data. Furthermore, the method for cleansing and reconciling involves the selection of plant data or parameters with average mass balance closure in the range of 98-102%, for a given period of time. The data reconciliation may be used for conditioning the training data sets from the plant to ensure that the data is consistent. The data reconciliation technique exploits the existing system redundancy from measured data to adjust and estimate relevant process data (flow/temperatures) that satisfy energy and mass balance constraints. For instance, in a given period of time where there is no-significant change in operating variables, the average mass in-flow to CDU should be equal to the outflow. This approach is used for consistent building part of the training data set that is representative of a steady mode of operation.

Figure 2B:
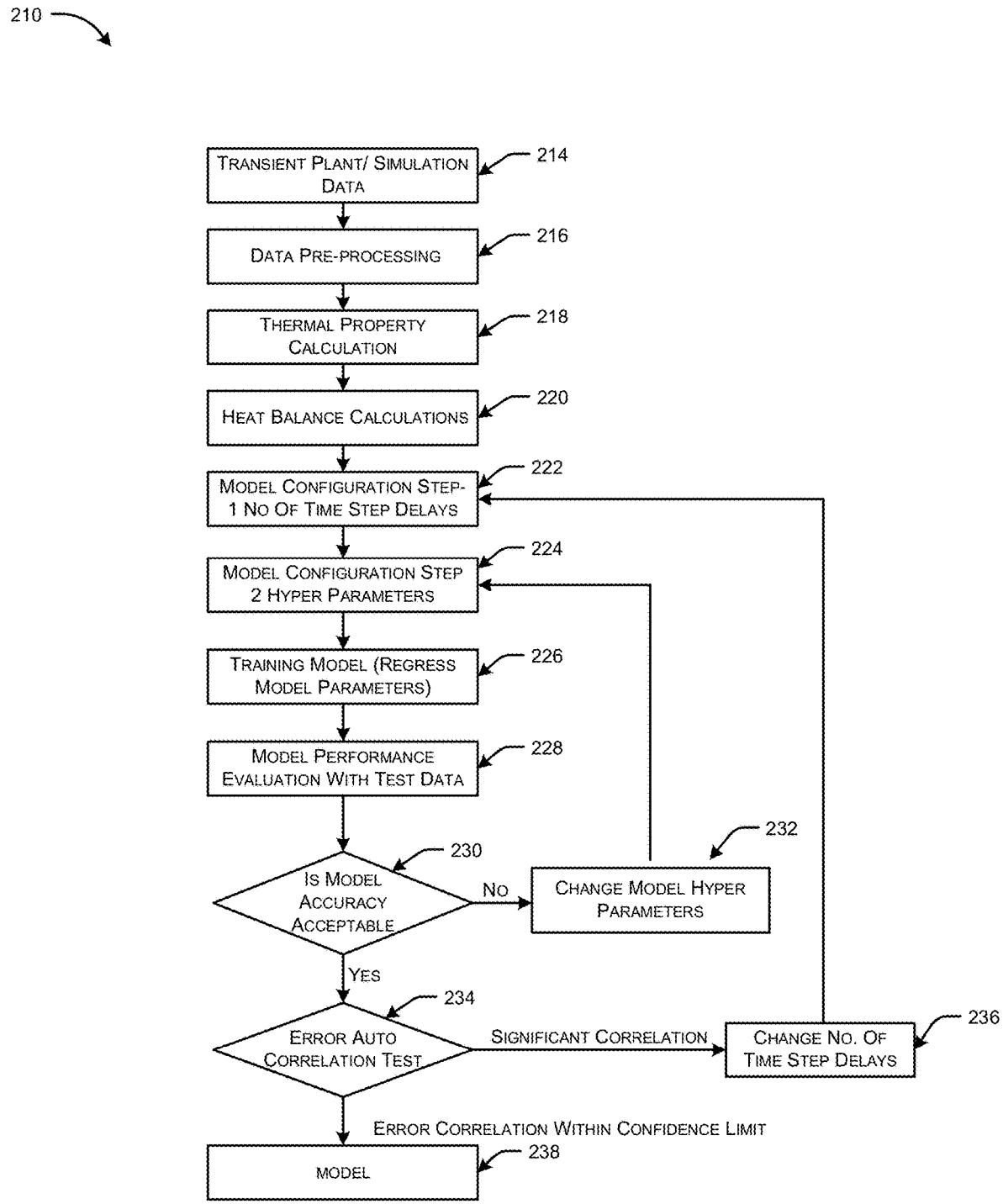
FIG. 2B illustrates an exemplary method to develop and train a deployable model for the proposed system and method, in accordance with an embodiment of the present disclosure.

In an embodiment, the training and testing unit 122 can enable the processing unit 108 to use the pre-processed/conditioned data from CDU 102 or generated by first principal model simulations. The training data set is transient data set containing data representing both steady and unsteady states of operation. FIG. 2B depicts the training method 210 used for training and development of a deployable model.

As illustrated in FIG. 2B, during training and development of the deployable model at step 210 of the proposed method 200, the pre-processed transient data can be divided into training, testing, and validation sets. In step, 218, thermal properties for feed/product stream corresponding to each time step can be calculated by thermal property calculator unit 126. Subsequently in step 220, the heat balance calculations can be performed by the heat balance calculator 128. The fraction of crude vaporized at the inlet and/or the volatility parameter along with the column operating parameters can be used as input to the model.

The first step of model configuration 222, starts with defining a number of time step delays. To start with, a model with zero or one time step delay can be used. In practice, a model or a control system that does not use any time delay may not work properly if the involved variables have dead time or lag time associated with it. In few cases, one may directly calculate the time lag and include it as a part of the model. However, for dynamic systems involving accumulation term or un-steady state which doesn't close mass balance to 100%, one may not have the exact time delay function and it becomes necessary to account for the influence of the previous step on the current optimal solution. Accordingly, this autoregressive exogenous model includes the current input, previous input and output to define the unit performance as defined in function $y(t)=f^{NN}(x(t), x(t-1), \ldots x(t-n), y(t-1), y(t-2) \ldots y(t-n),)$, where $f^{NN}$—non-linear function described by a Neural network or machine learning model, $y(t)$—output variables at time t, $y(t-n)$—output variables at time t-n time, $x(t)$—input variables at time t, and $x(t-n)$—input variables at time t-n time. Here in the time step is defined as the frequency at which measured data is available to the user. Users may change the time step by data interpolation. The method provides a means to correlate such dependencies based on plant transient data.

In the second step of model configuration 224, hyper parameters are selected for a given delay-based model. For neural networks, hyper parameters are the variables that determine the network structure (such as selecting activation functions, number of the hidden layer, number of neurons per layer, etc.) and variables that determine how a network is trained (such as learning rate, regularization parameter, etc). Once the model configuration is defined model parameters viz. weights and biases are trained to minimize the mean square error between plant/measured output and the model predicted output. The algorithm used for training the model is known to those skilled in the art. In order to avoid overfitting or underfitting, model accuracy is tested against the validation set which is not a part of the training data set.

Figure 3:
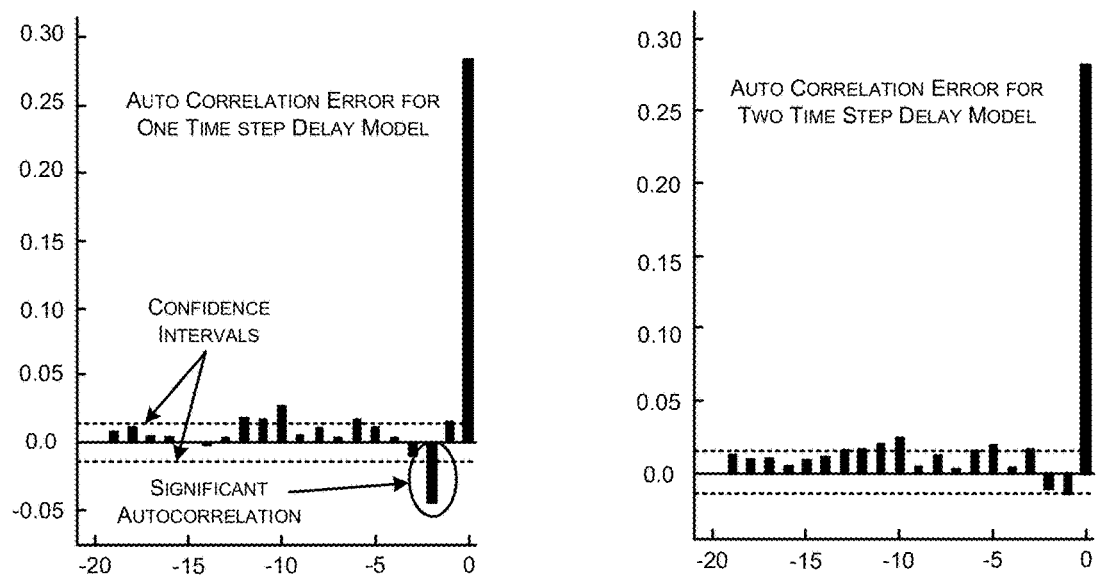
FIG. 3 illustrates an exemplary use of the error autocorrelation test for the selection of a number of time step delays in the proposed system.
Figure 4:
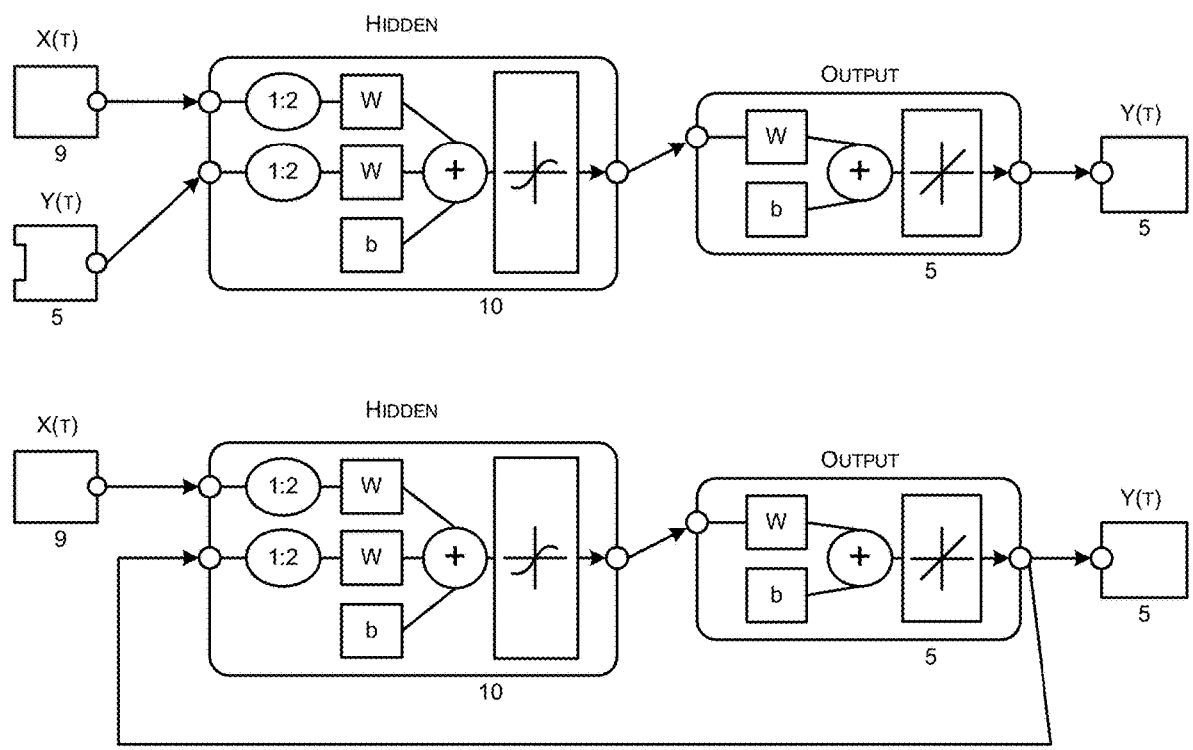
FIG. 4 illustrates an exemplary open loop and closed loop autoregressive exogenous neural network model of the proposed system for an atmospheric distillation column, wherein, the open-loop model is used as a part of the training process and closed-loop recurrent model is used for making forecasting predictions even when external feedback is missing.

Once the model is fitted its accuracy is evaluated w.r.t test data set (step 230), if the model accuracy does not improve despite varying weights and biases, it indicates a need for change in the model hyper parameters (step 232). If the test case accuracy is acceptable, then the error autocorrelation test (step 234) is used to check if whether there is a significant correlation. In step 234, autocorrelation in the current model is compared with another having one lower time dependence as illustrated in FIG. 3. The autocorrelation can be checked if they are within the confidence limit, and if not found satisfactory one need to revise the delay steps used in the model (step 236). If the error correlation is within the confidence limit, the model can be used for prediction purposes. This approach can be used for training parameters for plant and/or property prediction units. In order to make future predictions, the open-loop model is transformed into a closed-loop recurrent model as illustrated in FIG. 4. This allows making forecasting predictions even when external feedback is missing, by using internal feedback.

Figure 5:
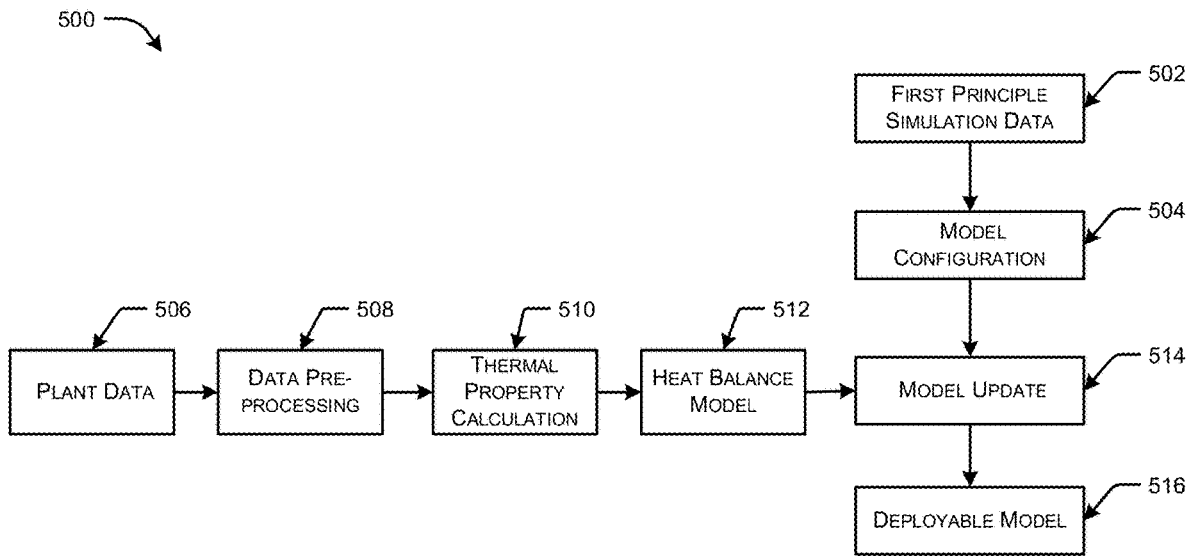
FIG. 5 illustrates an exemplary method to develop and train the deployable model of FIG. 2B using a combination of plant and first principal simulation data, in accordance with an embodiment of the present disclosure.

As illustrated in FIG. 5, in an embodiment, a training method 500 using a combination of plant or CDU 102, and first principal simulation data is disclosed. The data generated using the first principal simulations can be used to configure and train a dynamic model (steps 502 and 504). This model may not be able to exactly match the plant data but is based on fundamentals and provides a reliable representation of the underlying cause and effect relationship. To overcome this challenge, the model is updated using plant data. The model updating step (514) involves adapting/fine-tuning of model parameters to match the plant data. The updated model is able to appropriately capture both the underlying physics and provide reliable predictions.

Figure 6:
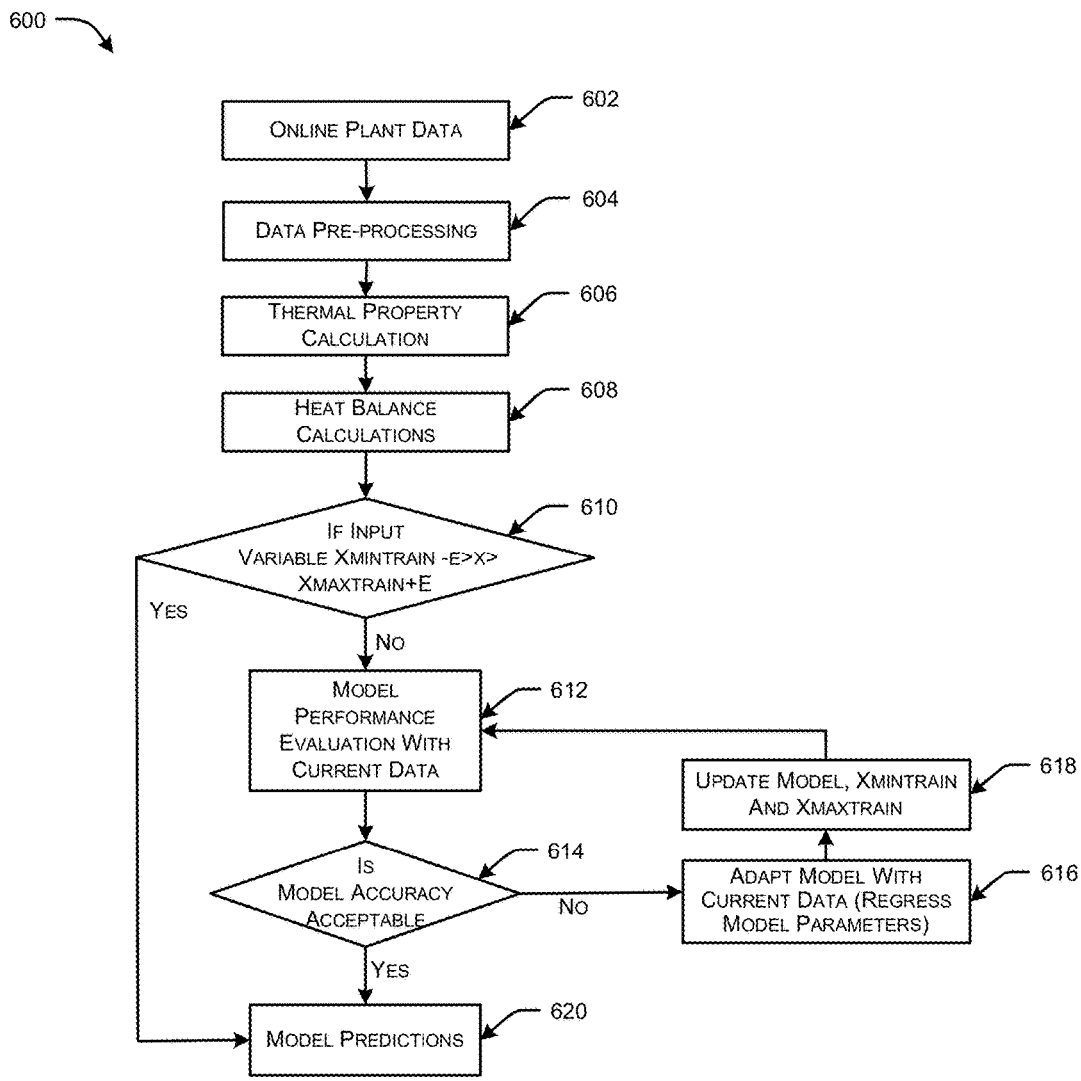
FIG. 6 illustrates an exemplary self-learning and self-updating method for the model, wherein the adequacy of the model is evaluated, and if required, the model updates itself using online plant data, in accordance with an embodiment of the present disclosure.

In certain cases, when the online plant data is far from the training data set in terms of crude quality and operation regime, it is necessary to test the accuracy of the predictions. To ensure the property prediction unit is always up to date, a self-learning and self-updating method 600 as illustrated in FIG. 6 can be built. The online plant data (step 602) can be processed/conditioned (604), the thermal property can be calculated (606) and used for heat balance calculation. In subsequent step 610, each input variable from the data set can be compared with the maximum (Xmaxtrain) and minimum (Xmintrain) values for the corresponding variable from the training data set. If the input data set is far from the training data set, the model performance can be evaluated (step 612) with current data. A user-defined variable E can be used to indicate how much variation from the maximum and minimum limit is permitted. The prediction accuracy (step 614) can be checked vis-a viz the actual plant output and if found satisfactory one may proceed to step 616 by adapting/fine-tuning model parameters to match current plant data. Model parameters, Xmaxtrain and Xmintrain are updated (step 618) so that the model is capable of predicting under diverse feed/operating conditions. This self-learning approach can be more relevant when the prediction unit parameters are trained only using the plant data or parameters.

In an embodiment, the thermal property calculator unit 126 can enable the processing unit 108 to estimate hydrocarbon stream heat of vaporization and specific heat capacity. The hydrocarbon stream latent heat of vaporization and heat capacity is required for the calculation of column heat load and heat balance calculations. The most usual assumption is that thermal properties value does not change significantly. However, in practice, the value associated with thermal properties changes depending upon its constituent components which in turn depends on crude composition and operating conditions.

Figure 7:
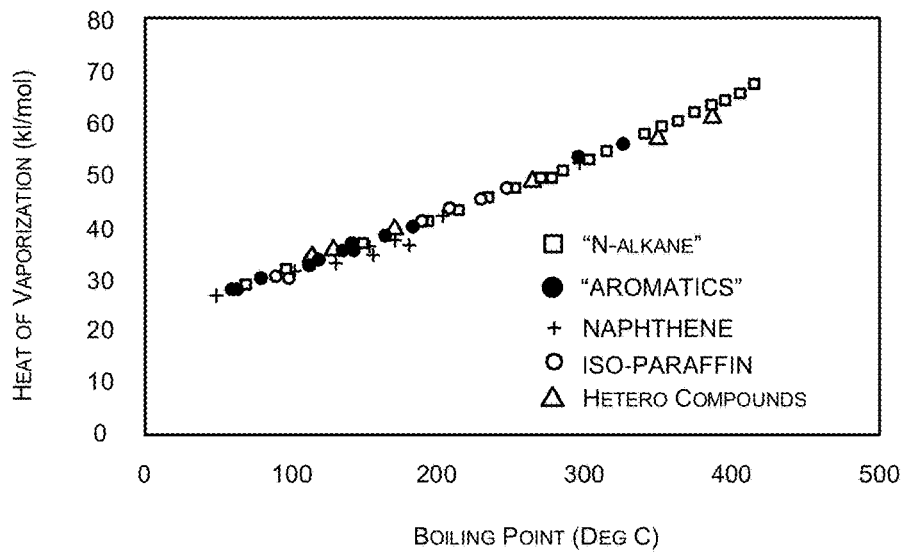
FIG. 7 illustrates a correlation between Heat of Vaporization and normal boiling point for pure components typically present in hydrocarbon streams.

FIG. 7 shows the relation between molecular heat of vaporization ($\Delta H_{vap}$) and boiling point ($T_b$) for pure component species present in crude oil. For pure component linear, branched paraffin, low to medium molecular weight naphthenes, and aromatics, the molecular heat of vaporization and boiling point is found to have a linear relationship ($\Delta H_{vap}=a\, T_b+c$), where a and c are linear regression coefficients. The relationship may have slight deviations for heterocyclic compounds which may induce special interactions (such as hydrogen bonding) between the molecules.

For crude oil and CDU product streams, they don't sharp boiling point rather they have a boiling range and it is not possible to have an online measurement of hydrocarbon composition to understand the non-ideal interactions. Standard practice would be to get crude/product assay details to characterize hydrocarbon mixture stream into pseudo components with an estimated critical point, molecular weight, acentric factor, specific gravity, and/or Watson characterization factor which are then used for calculation of thermal properties. It is possible to make such calculations if crude mixture feed ratio and assay details are known in advance and the unit is a steady-state mode of operation. However, such an approach does not work during feed transitions and unsteady state operations.

Therefore, correlations are developed to estimate the heat of vaporization based on product draw temperatures and crude S.G using function $\Delta H_{vap} = f^1(S.G, T_d, T_{d-1}, T_{d+1}, P)$, where $f^1$—correlation function for heat of vaporization built using standard Machine learning/Neural Network tools, $T_d$—hydrocarbon stream draw temperature, $T_{d-1}$ and $T_{d+1}$ are the neighboring stream draw temperatures, P—Draw stage pressure (to account for a change in boiling temperature with pressure). In absence of stage pressure column top and flash-zone pressures are used.

Likewise, heat capacities for hydrocarbon product streams can be correlated with the draw temperatures and crude S.G using $Cp = f^2(S.G, T_d, T_{d-1}, T_{d+1}, P)$, where $f^2$—correlation function for specific heat capacities built using standard Machine learning/Neural Network tools.

Process simulations using a large number of crudes with product fraction and their properties obtained at varied operating conditions are used for the generation of thermal property data. This data is then used to build the aforementioned Machine learning/Neural Network correlation functions.

Figure 8:
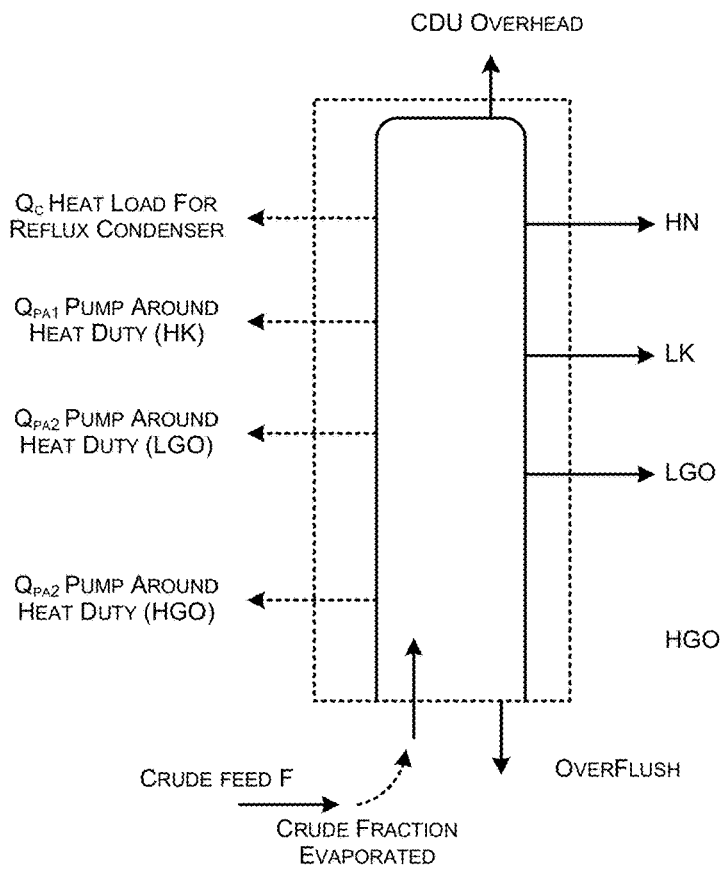
FIG. 8 illustrates a simplified representation of heat balance for the rectifying section (envelope for heat balance shown by dotted lines) of an atmospheric distillation column, having 5 side streams namely, Heavy Naphtha (HN), Light Kerosene (LK), Heavy Kerosene (HK), Light Gas Oil (LGO) and Heavy Gas Oil (HGO), in accordance with an embodiment of the present disclosure.
Figure 9:
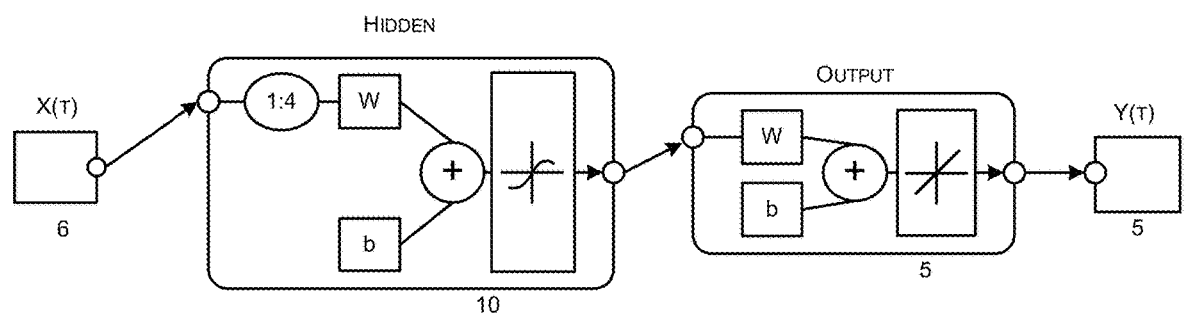
FIG. 9 illustrates a time-delay neural network model used to make product quality/property predictions.

In an embodiment, the heat balance calculator unit 128 can enable the processing unit 108 to use the plant conditions and the estimated thermal properties to perform heat balance calculation. Rather than performing rigorous stage-wise heat balance calculation, heat balance calculation can be performed across rectifying and stripping section of the column. FIG. 8 illustrates a simplified representation of the envelope around which heat balance is performed for the rectifying section of the column.

The saturated hydrocarbon vapor at the flash zone temperature and pressure are chosen reference conditions for the energy balance. Typical heat balance calculation involves the function $H_{in} - H_{out} = 0$, where $H_{in}$ is heat energy entering the system, and $H_{out}$ is the heat energy leaving the column is the sum of the heat energies contained in the side-streams, over flash, overhead vapor enthalpy and heat duties of the reflux/pumparounds.

Further, Fractional Crude Vaporized at Flash-zone ($V_F$) can be derived by the processing unit on the basis of heat balance calculations. The $V_F$ can be a function of (Crude/product thermal properties, Column Ops Conditions, Furnace temperature), where Column Ops Conditions includes—"Draw Temperatures", "Reflux & Pump around flow, draw and return temperatures", "top and flash zone pressure", "steam/crude flow ratio", "crude feed flow rates".

Furthermore, Fractional Crude Vaporized can be calculated using the function $V_F = \{[\Sigma Q - C_{pvo}*(T_f - T_o)*F_o]/[H_v + C_{pv}*(T_f - T_o)/2]\}/F_{crude}$, where $\Sigma Q$ is total cooling load of tower (Condenser load+Pump around load), $T_f$=Flash zone temperature, $T_o$=Overhead condenser temperature, $F_o$=Overhead vapour flow rate, $F_{liq}$=Flow rate of total liquid products in the column, and $F_{crude}$—Crude Flow rate.

Accordingly, Volatility can be calculated by the processing unit using function Volatility=$(100*V_F)/(T_{fc} - T_{oc})$.

Thus, the heat balance calculator unit 128 can provide inputs such as a fraction of crude vaporized ($V_F$) and volatility which can be used by the plant yield predictor. The heat balance calculator unit 128 can also be used for data reconciliation step 216 of data pre-processing by the data receiving and pre-processing unit 120.

In an embodiment, the plant yield predictor unit 130 can enable the processing unit 108 to use a dynamic plant model that uses transient plant data including current and previous measurements to account for the unsteady nature of the operation during crude transitions and with the change in operating conditions. This approach provides a better definition for input-output relation and accounts for the delay in response. Accordingly, time-variant data consisting of all the feed flow rate, feed online property (e.g S.G), side strippers flow rates, pump around rates, pump around return temperatures, available column temperature, and pressure profile are used as input to the prediction module.

The product yield y(t) at a time t can be calculated using a function of autoregressive exogenous model, $y(t) = f^{NN}(x(t), x(t-1), \ldots x(t-n), y(t-1), y(t-2) \ldots y(t-n),)$, where $f^{NN}$—non-linear function described by the Neural network or machine learning model, y(t) and y(t-n)—product yields at time "t" and "t-n", and x(t) and x(t-n)—plant measurements (i.e. product draw furnace outlet & flash zone temperatures, column pressure, feed & steam flow rates, crude density/S.G.) and calculated $V_F$ or volatility at time "t" and "t-n".

It may be noted that the prediction module can also be configured based on available plant measurement in absence of any measurement. However, it is desirable to have at least one crude bulk property such as S.G. as input to the module to enhance the accuracy of the predictions.

In an embodiment, the property prediction unit 132 can include a set of neural network/machine learning models used to link the CDU product properties with the plant operating conditions and crude density or S.G. Key product properties. If online data is available an approach analogous to the plant prediction module can be directly employed for property prediction. However, in many cases, online analysers are not available for product quality measurement and one has to rely on laboratory results. While using laboratory results, the time-stamped laboratory data has to be synchronized with plant measurements.

The product quality measurements are usually the slowest to respond to process changes. To account for this, a time-delay neural network model can be used for the property prediction unit 132. This allows the network to have a finite dynamic response to time series input data using a function $y(t) = f^{NNP}(x(t), x(t-1), \ldots x(t-n))$, where $f^{NNP}$—time-delay neural network model, y(t)—product quality/property at time t, and x(t)—input variables viz. draw temperatures, product/pumparound/steam flow rates, stripper duty, stripper top/bottom temperatures, and pressure. It may be noted that the model could be configured using fewer variables, wherein only the most relevant variables are selected for the prediction purpose. For instance, one may select only the draw temperature, draw pressure, respective stripper top/bottom temperature, and pressure conditions for predicted product flashpoint.

In an embodiment, the property prediction unit 132 can enable the processing unit 108 is configured to determine product stream quality indicators comprising ASTM D86, D1160 distillation points, for the predefined time 't'.

In an embodiment, the dynamic optimization unit 134 can enable the processing unit to receive feed/product pricing data, and operability/capacity constraints via the interface. The optimization unit 134 can maximize the profit for the CDU 102 by adjusting the values of key decision variables or input parameters of the CDU while meeting product specifications and plant feasibility constraints.

The objective function to be maximized is defined as the sum of the revenue of the products, minus the cost of the crude oil and the utilities. The constraints typically represent product quality constraints (for example ASTM distillation temperatures, Flash Point, Freeze Point, etc.) and equipment operability aspects (such as maximum flow, temperature, duty limits, etc.). The decision variables are those typically varied by operators in order to meet specifications—for example, product draw rates, product draw temperature and stripping steam rates, reflux and pumparounds.

The dynamic optimization unit 134 can have the following features to make a robust solution including providing an option for linear, non-linear, equality, and inequality constraints. Also, provides an option for linearization of non-linear constraints, providing an option for selection of standard Optimization Algorithms, and in case of infeasible optimization solution retaining plant current values and maintaining a record for such instances of infeasible solutions. This high predictive accuracy, combined with very low computational costs makes the dynamic optimization module very well suited for real-time monitoring and optimization of CDU 102.

The present disclosure will now be illustrated with working examples, which are intended to illustrate the working of the present system 100 and method 200 and not intended to be taken restrictively to imply any limitations on the scope of the present disclosure.

The following discussion is directed to various examples of the present subject matter. Although certain methods have been described herein as examples, the scope of coverage of this patent is not limited thereto. On the contrary, the present subject matter covers all methods and ranges fairly falling within the scope of the claims either literally or under the doctrine of equivalents.

Example 1: Plant Prediction Module for Atmospheric Crude Distillation Unit

This example illustrates the application of the invention for the performance prediction of the Atmospheric Crude Distillation Unit. The unit under consideration separates the feed crude oil entering the column into an overhead product, Heavy Naphtha (HN), Light Kerosene (LK), Heavy Kerosene (HK), Light Gas Oil (LGO), Heavy Gas Oil (HGO) and Reduced Crude Oil (RCO). The crude feed is heated using pre-heat exchangers and followed by a furnace which ensures that desired temperature is achieved. The unit is equipped with 5 stripper columns for HN, LK, HK, LGO and HGO products. The column is also provided with one top reflux and 3 pumparounds (PA)/circulating reflux namely Kerosene PA, LGO PA and HGO PA. These PA's help in optimizing heat recovery from the column & are drawn from the common draw-off for products. The column is equipped with a number of flow sensors and temperature sensors for control and monitoring purposes. There is a density meter installed on the feed line which measures the density of combined crude feed from one or multiple tanks.

The transient crude density values as obtained from the online analyzer are converted to S.G. The pre-processed column draw temperatures and S.G data can then be used by thermal property calculator unit 126. Plant measurements and thermal properties can be used for heat balance calculations (across an envelope as shown in FIG. 8) to obtain a fraction of crude vaporized $V_F$ and volatility at each time step.

Figure 10A:
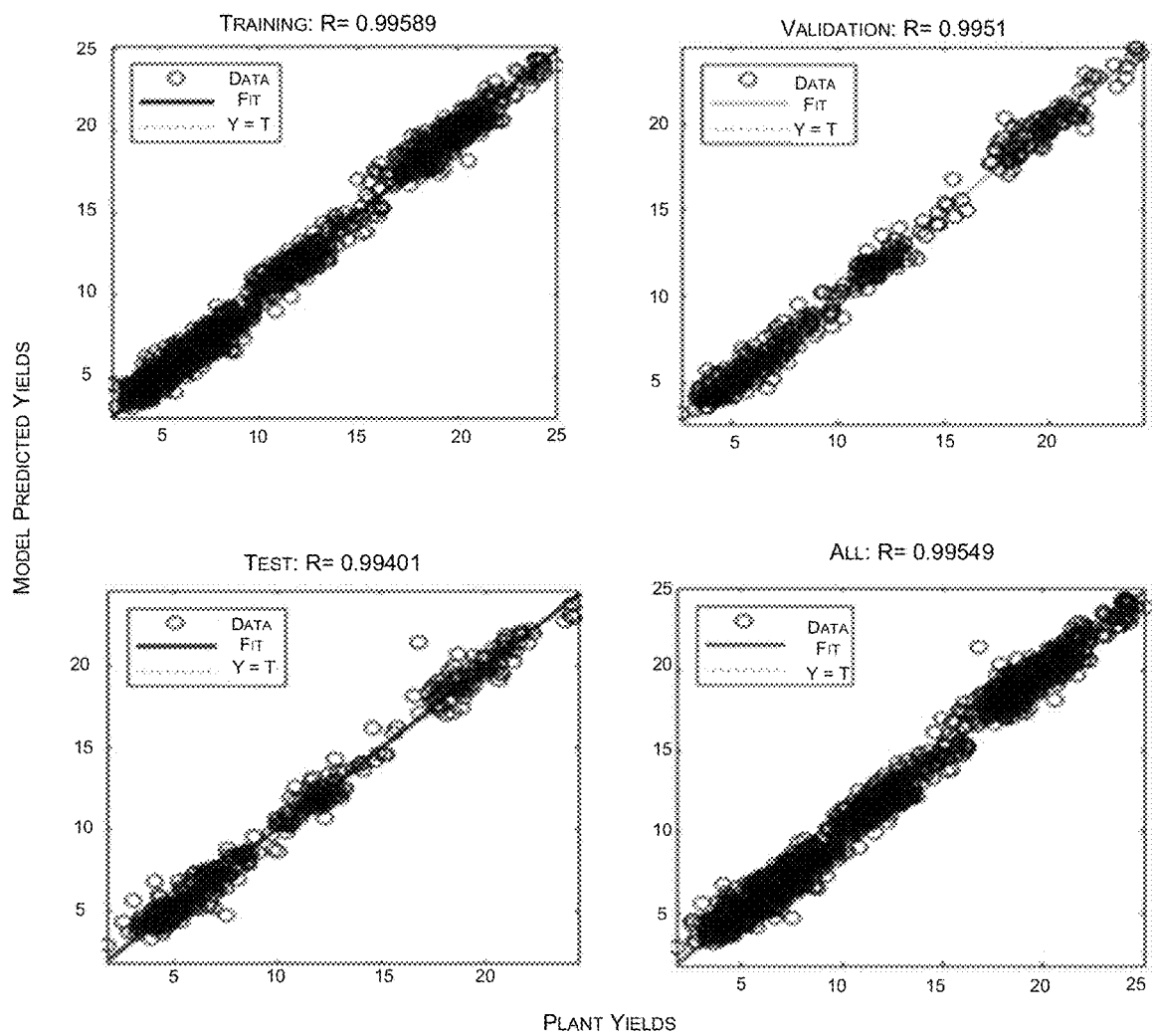
FIG. 10A illustrates an Atmospheric Crude Distillation Unit model performance in terms of parity plot for plant yields vs model predictions for training, validation, and test data sets.

In an exemplary implementation, the data set consisting of 4000 data set can be divided into training, validation, and test set. The training method 210 as illustrated in FIG. 2B, was used for training the model. Accordingly, based on the error autocorrelation test, two time step delay can be selected over one time step delay model as shown in FIG. 3. Further, the neural network model hyper parameters and model parameters were trained, and the product yield y(t) at a time 't' was calculated, using $y(t)=f^{ACDU}(x(t), x(t-1), x(t-2), y(t-1), y(t-2))$, where $f^{ACDU}$—Atmospheric Crude Distillation Unit described by autoregressive exogenous Neural network model using current and previous input/data, y(t), y(t-1) and y(t-2)—product yields at time t, t-1 and t-2, and x(t), x(t-1) and x(t-2)—plant measurements (i.e. product draw furnace outlet & flash zone temperatures, column pressure, feed & steam flow rates, crude density/S.G.) and calculated $V_F$ at time t, t-1 and t-2. The parity plot for plant yields vs $f^{ACDU}$ model predictions for training, validation and test set is depicted in FIG. 10A, and the model predictions were found to be having a good agreement with plant data.

Figure 10B:
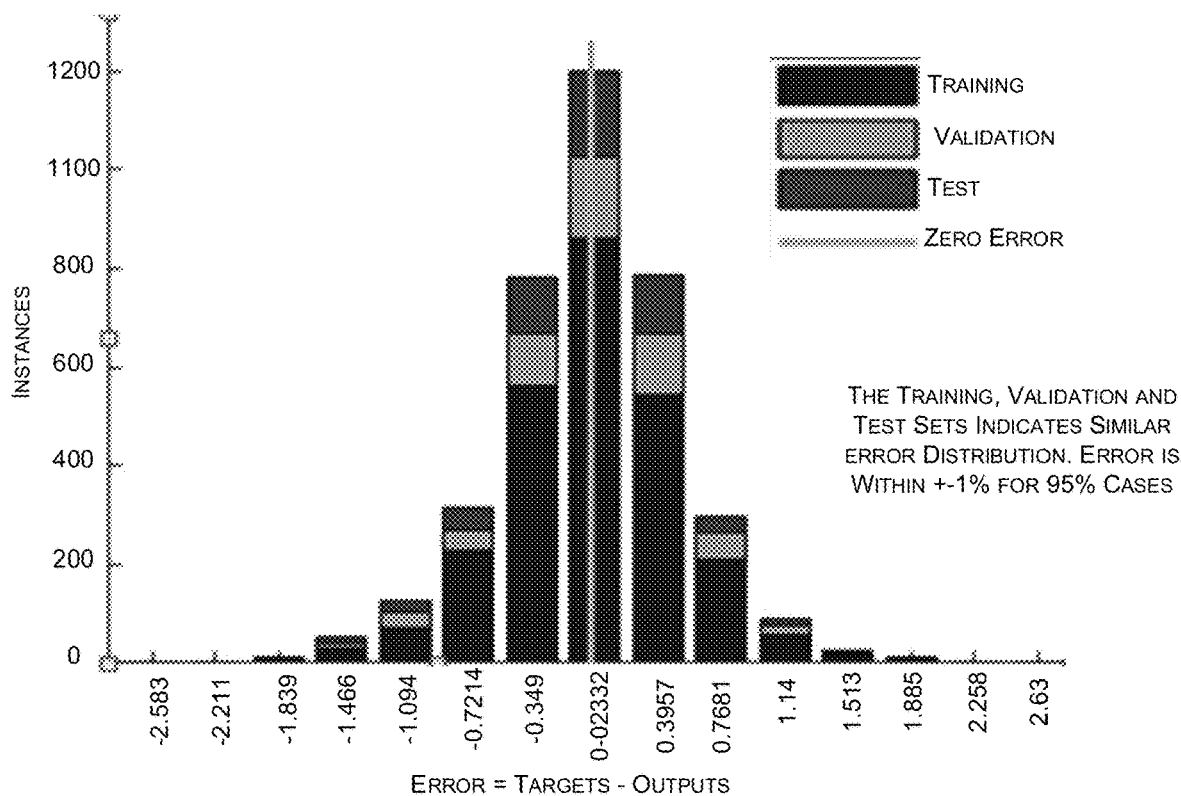
FIG. 10B illustrates the Atmospheric Crude Distillation Unit model performance in terms of error distribution curve for the model prediction with training, validation, and test set
Figure 10C:
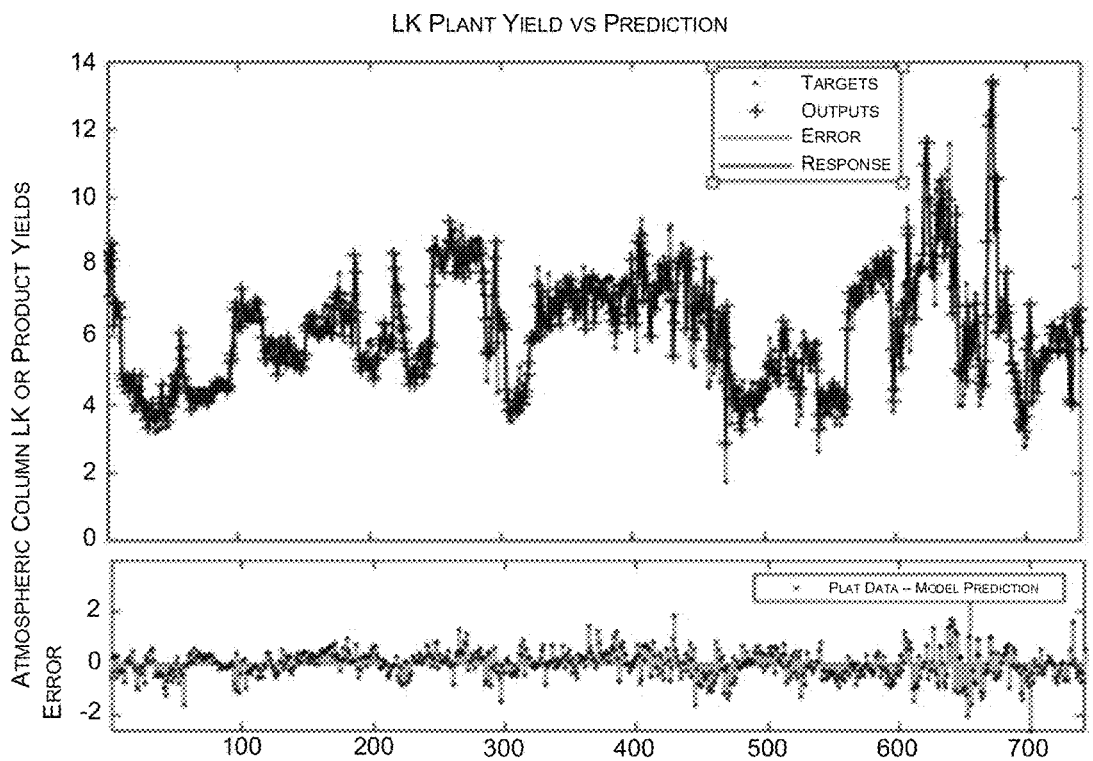
FIG. 10C illustrates the Atmospheric Crude Distillation Unit model performance with online plant data in terms of LK plant yield vs prediction with respect to time.

The error distribution curve for the model prediction with training, validation, and test set is depicted in FIG. 10 B. The training, validation, and test set indicate similar error distribution. Error is within ±1% for more than 95% of cases. Having trained the prediction module, it was used to making plant predictions. The comparison of LK plant yield vs prediction with respect to time is shown in FIG. 10C. Model was found to provide reasonably good predictions the error was within ±2% for all the cases.

Example 2: Plant Prediction Module for Vacuum Distillation Unit (VDU)

This example illustrates the application of the invention for the VDU performance prediction. This example also illustrates the use of the prediction unit in absence of feed S.G, as RCO S.G may not be available in few cases. The RCO from an atmospheric column is heated to the desired temperature and fed to VDU. The VDU column under consideration fractionates RCO into 4 side stream products namely, Vacuum Diesel (VD), Light vacuum gas oil (LVGO), Heavy vacuum gas oil (HVGO) and Slop along with the VDU overhead at the top and vacuum residue (VR) at the bottom.

It may be noted that one may still use the crude density for thermal property calculations. Again, heat balance calculations are used for the estimation of the fraction of RCO vaporized at VDU flash-zone $V_{FVDU}$. The VDU model can be trained using a time-dependent autoregressive exogenous model as described in Example 1 above.

Figure 11A:
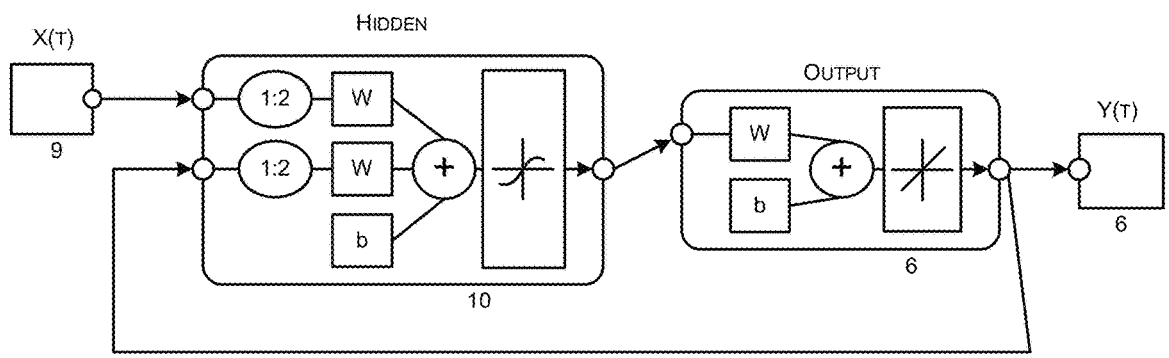
FIG. 11A illustrates the Vacuum Distillation Unit model performance in terms of parity plot for plant yields vs model predictions for training, validation, and test data sets FIG. 11B. illustrates the Vacuum Distillation Unit model performance with online plant data in terms of LVGO plant yield vs prediction with respect to time.

The parity plot for plant VDU yields vs VDU model predictions for training, validation, and test set is depicted in FIG. 11A. Model predictions were found to be having a good agreement with plant data. Although, the model fit r-square values were slightly better for Example 1.

Figure 11B:
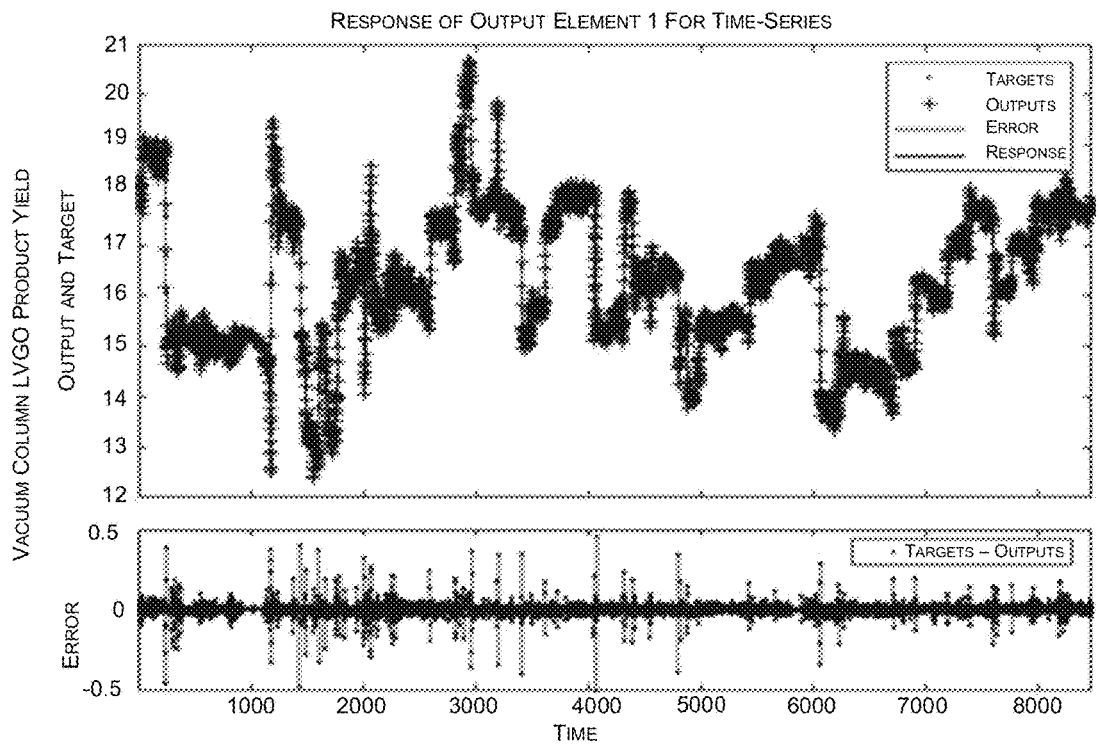

The VDU prediction module was used to making plant predictions. The comparison of LVGO plant yield vs model prediction with respect to time is shown in the FIG. 11B. The model was found to provide reasonably good predictions the error was within ±1% for all the cases.

Example 3: Property Prediction Unit

This example illustrates the application of the present invention for CDU product quality/property predictions. The product property is crucial as it defines the suitability of the petroleum stream for a particular application. Herein, we focused on predicting the flashpoint, freeze point, and ASTM D86/D1160 points for different product streams.

The time-stamped laboratory data was synchronized with the plant measurements. The synchronized combined data was pre-processed to remove bad data, noise, and outliers. The time delay neural network was trained to predict flashpoint, freeze point, and ASTM D86/D1160 points for different product streams.

Figure 12A:
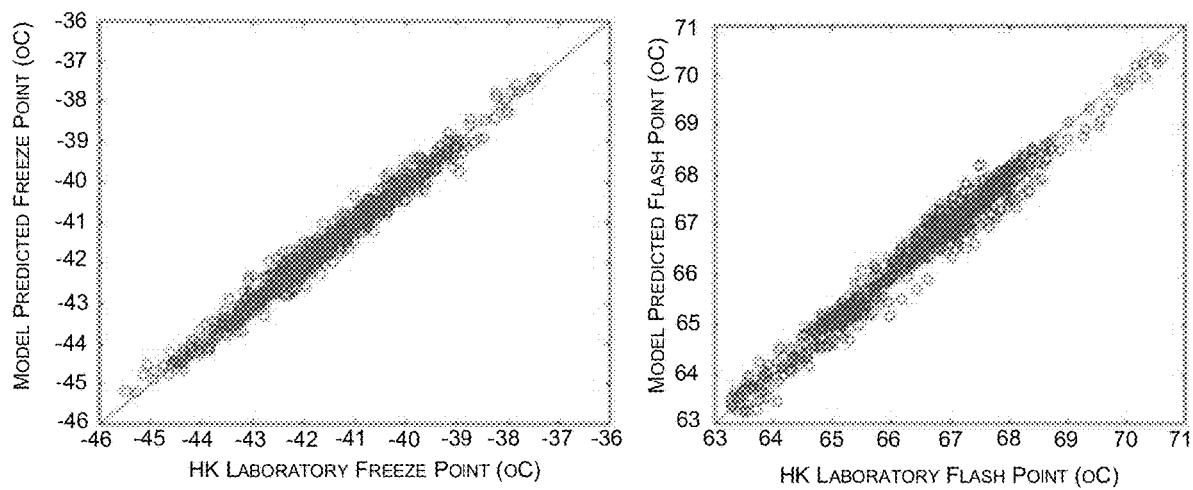
FIG. 12A illustrates the Property Prediction model performance in terms of parity plot for laboratory vs model predictions for HK freeze and HK flashpoint.
Figure 12B:
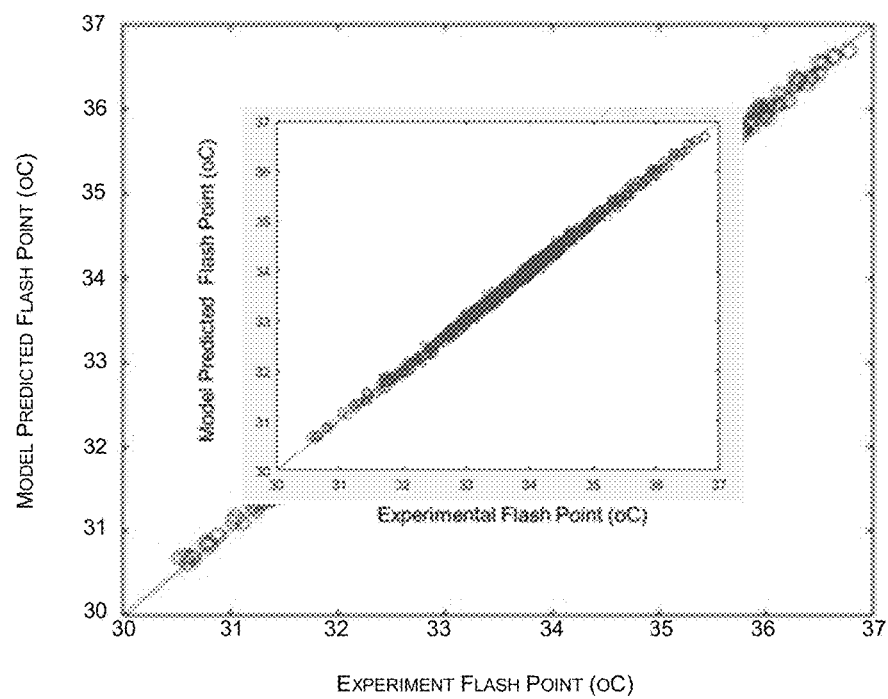
FIG. 12B illustrates the Property Prediction model performance in terms of parity plot for laboratory vs model predictions for LK flashpoint.
Figure 12C:
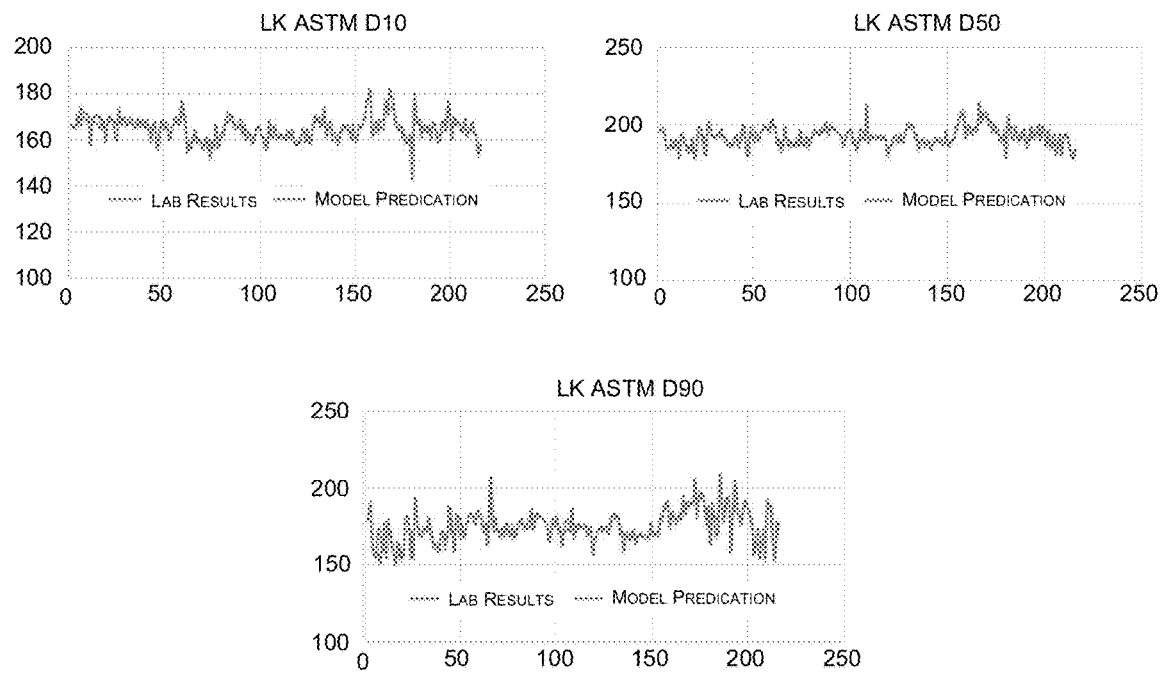
FIG. 12C illustrates the Property Prediction model performance in terms of parity plot for laboratory vs model predictions for ASTM D86 distillation temperatures at 10, 50, and 90% distillation yield for LK.
Figure 12D:
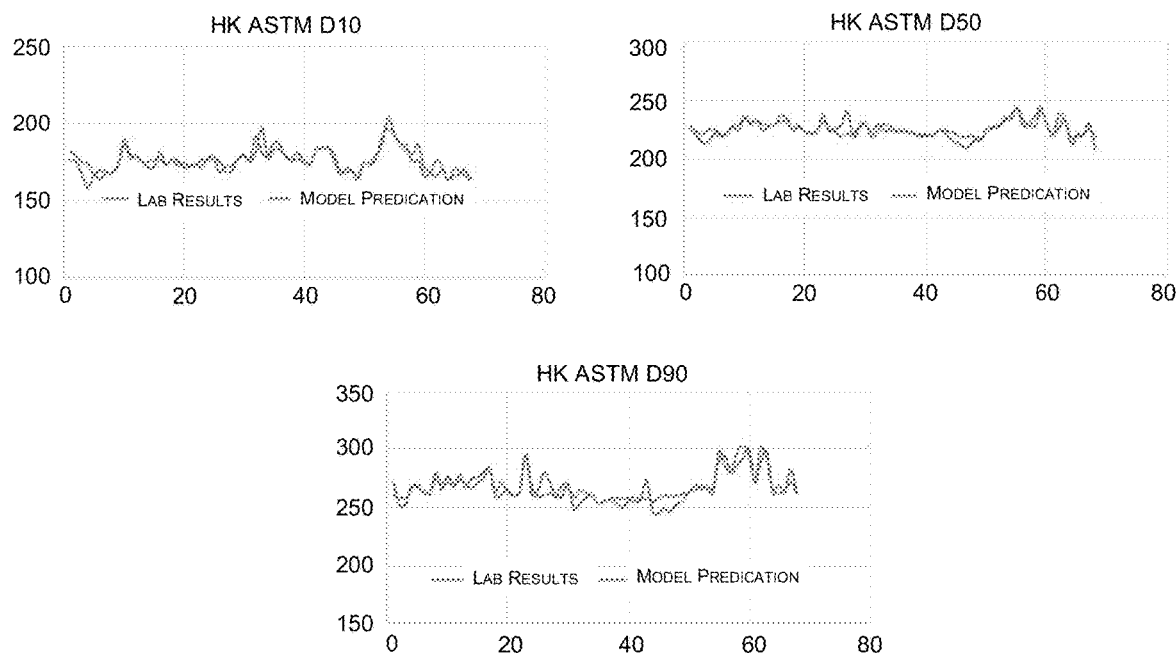
FIG. 12D illustrates the Property Prediction model performance in terms of parity plot for laboratory vs model predictions for ASTM D86 distillation temperatures at 10, 50, and 90% distillation yield for HK.
Figure 12E:
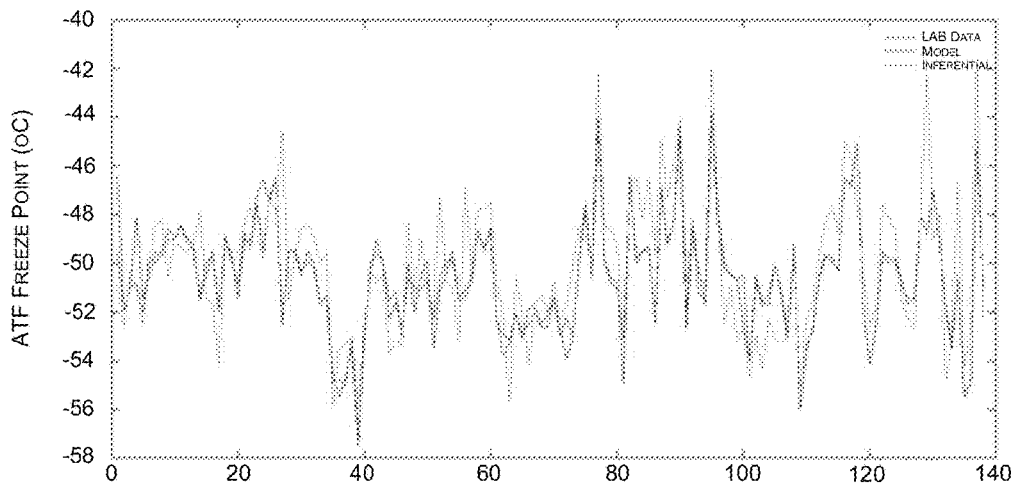
FIG. 12E compares the ATF freeze point prediction accuracy for the time-delay model and standard Refinery Inferential model w.r.t laboratory data.

The parity plot laboratory vs model predictions for HK freeze and flash point are depicted in FIG. 12A. Model predictions are found to be having a good agreement with plant data. Likewise, FIG. 12B shows that the model predictions are in good agreement with the laboratory results for LK flashpoint.

FIGS. 12 C and 12D also indicate that the ASTM D86 distillation at 10, 50, and 90% yields for LK and HK as obtained laboratory are in good agreement with the model predictions.

Typically, one may blend different product streams in a specific ratio to obtain fished refinery products. Aviation Turbine Fuel (ATF) is one such high-value product obtained from the blending of LK and HK streams. Herein, the neural network model uses LK/HK blend ratio and crude density/S.G. as input along with the column draw and stripper conditions.

FIG. 12 E compares the ATF freeze point prediction accuracy for the time delay model and standard Refinery Inferential model w.r.t laboratory data. It is seen that in comparison to refinery inferential model may show some deviation from laboratory data. However, the prediction by time-delay neural network model was in excellent agreement with laboratory data.

Example 4

This example illustrates the application of the proposed system and method for dynamic optimization of Crude Distillation Unit 102. The intention is to maximize the refinery economics during transition subject to product quality constraints. The system does not replace the existing APC (the control unit 106), whose role is to keep the plant as close as possible to the desired state indicated by the controller set points, but instead provides the optimal set point trajectories for the APC to follow.

The dynamic optimization unit 134 maximizes the profit for the CDU 102 by adjusting the values of key decision variables (furnace outlet temperature, column temperature, feed flow rates, product flow rates), while meeting product specifications (Flash pt. Freeze point, ASTM distillation profile) and plant feasibility constraints (maximum flow, temperature, pressure drop, duty, and hydraulic limits).

The objective function to be maximized is defined as the sum of the revenue of the products, minus the cost of the crude oil and the utilities as shown below.

Profit=ProductRevenue−CrudeCosts−UtilityCosts, where

Product Revenue=$\Sigma_{i=1}^{i=ProductN}$Flowrate$_i$×Price$_i$

Crude Costs=CrudeConsumption×CrudePrice, and

Utility Costs=(Steam Consumption×SteamPrice)+ (Fuel Consumption×Fuel Price).

Figure 13:
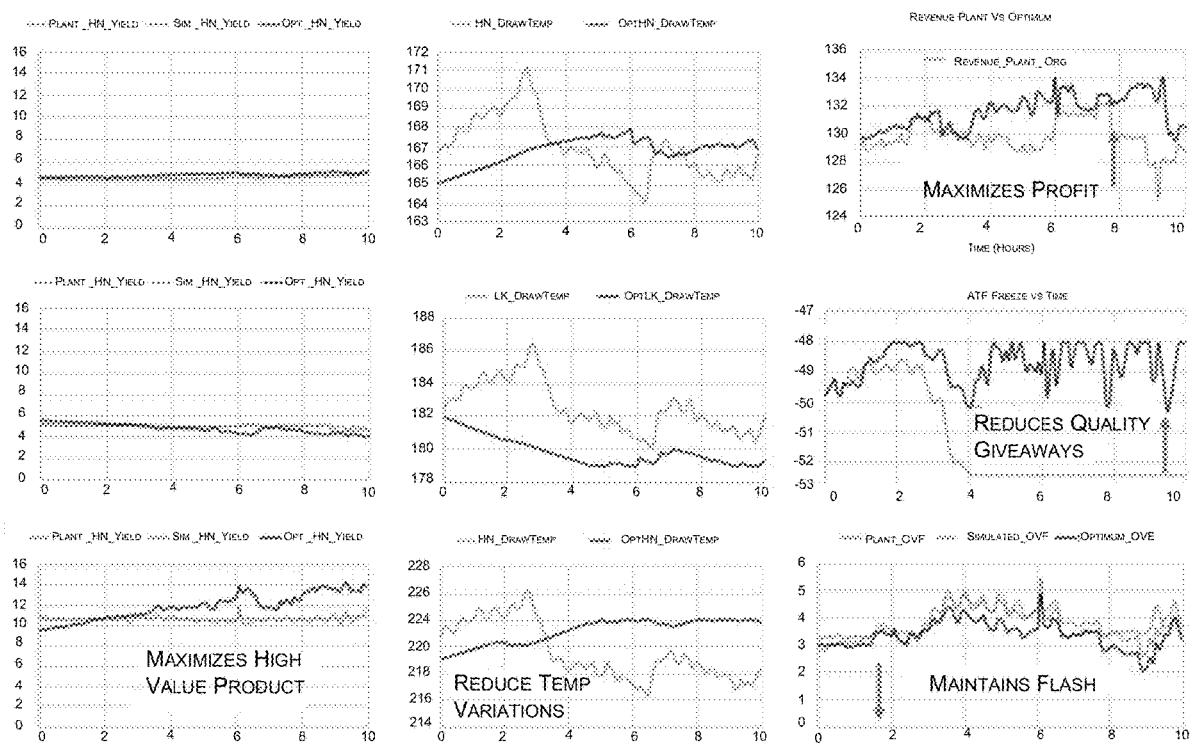
FIG. 13 illustrates the Dynamic Optimization Module performance and summarizes the key optimization results. The first column—plant yield, the simulated yield for plant condition, and predicted yield for optimized conditions for Heavy Naphtha (HN), Light Kerosene (LK), and Heavy Kerosene (HK) (shown in the first column). Second column—The plant and Optimized draw temperature for HN, LK, and HK. Third Column-Revenue Plant Vs Optimized case, ATF freeze point Plant Predicted vs Optimized, plant, simulated, and Optimized over flash flow rates.

The product pricing data, property constraints, operability, and capacity constraints are fed via a user interface. The case of crude transition from CDU column feed Crude Mix 1 to Crude Mix 2 is considered. The key results of the optimization run are summarized in FIG. 13. The optimizer outputs show the plant yield, simulated yield for plant condition and predicted yield for optimized conditions. The simulated yields were in good agreement with the plant.

The optimized solution indicated an increase in the value of high-value HK yield (one of the components of ATF product) with marginal or no change in HN and LK yields with an overall increase in distillate yield 3-4% at the end of 10 hours of an optimization run.

It is to note that ATF product quality is controlled indirectly, by controlling LK flash and HK freeze. Typically, one controls HK Product Flow to control HK Freeze, which in turn decides the ATF Freeze. It is seen that the plant predicted ATF freeze properties were much lower than the specification limit of −47° C. The dynamic optimization unit 134 on the other hand tries to keep to close to −48° C. (the ATF freeze point constraint of −48° C. was used in the optimizer input). Herein, the dynamic optimization unit 134 tries to draw more of HK quality giveaway of high-value HK to relatively lower value LGO which forms a part of the diesel pool.

The comparison of plant and predicted optimum draw temperature profile, clearly indicates that the optimized solution provides less fluctuation in draw temperature. Thus, helps in providing a more stable and smooth transition during crude transitions. As the CDU can stabilize in much less time one may also use the optimizer to reduce the time required for crude transitions.

To optimize the problem using a first principle dynamic optimization model, the optimizer has to solve ~160000 algebraic and ~5000 differential equations. For this, the first principal model takes about 72 hours for optimizing 10 hours of the crude transition period. On the other hand, the dynamic optimization model provides an optimum solution within 10 minutes. This high predictive accuracy, combined with very low computational costs makes the developed optimizer very well suited for real-time dynamic optimization applications While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

ADVANTAGES OF THE INVENTION

The proposed invention provides an efficient, accurate, fast, and robust system and method for dynamic optimization of a crude distillation unit.

The proposed invention provides an efficient, accurate, fast, and robust system and method for dynamic prediction of plant yields and product characteristics based on crude column operating conditions.

The proposed invention provides a system and method for dynamic optimization of crude distillation unit, without requiring or depending on the crude assay, TBP, laboratory analyzers, and composition details of crude.

The proposed invention determines the thermal property, heat balance, and plant yield of a crude distillation unit.

The proposed invention reconditions, cleanses, or reconciles received plant data or parameters, for real-time dynamic optimization of crude distillation unit and for model training application.

The proposed invention reduces the computational time for dynamic optimization of a crude distillation unit, and dynamic prediction of plant yields and product characteristics.

The proposed invention provides a system and method for dynamic optimization of crude distillation unit that accounts for dynamic change in crude composition and unsteady nature of the operation during crude transitions.

The proposed invention trains autoregressive exogenous models and training methods associated with the dynamic optimization system and method to select an optimal number of time step delays/steps for the model.

The proposed invention provides a system and method for dynamic optimization of crude distillation unit that adapts the autoregressive exogenous models and training method by fine-tuning model parameters if the accuracy of the model is not within an acceptable range.

We claim:

1. A system for dynamic optimization of a crude distillation unit (CDU), the system comprising:
    a set of sensors positioned at predefined positions in the crude distillation unit and associated plant, the set of sensors configured to monitor one or more parameters associated with the CDU and the plant, and correspondingly generate a first set of signals;
    a processing unit in communication with the set of sensors, wherein the processing unit is configured with a neural network model, and comprising one or more processors operatively coupled with a memory storing instructions executable by the one or more processors, and configured to:
        receive the generated first set of signals from the set of sensors at pre-defined time steps;
        extract a set of input parameters, a set of output parameters from the received first set of signals;
        calculate, using an autoregressive exogenous time dependent model, thermal property, heat balance, and product yield of the CDU for each of the pre-defined time steps, based on the extracted set of input parameters, and correspondingly generate a first set of data packets;
        train and test, the neural network model and the autoregressive exogenous time dependent model, using any or a combination of the extracted set of input parameters, and set of output parameters, and the generated first set of data packets, to determine an optimal value of the pre-defined time steps for subsequent receipt of the first set of signals from the set of sensors; and
        determine optimum values of the set of input parameters, and the corresponding set of output parameters of the CDU for a predefined time, based on the set of input parameters, and the corresponding set of output parameters received at real-time, and at previous optimal time steps.

2. The system as claimed in 1, wherein the set of input parameters comprises a first set of input parameters selected from temperature of draw furnace outlet, pumparound return temperature, temperature profile of a distillation column of the CDU, pressure profile of the distillation column, and temperature and pressure of flash zone; and a second set of input parameters selected from steam flow rate, stream draw temperature, pumparound flow rate, crude flow rate, crude density, crude specific gravity (S.G), volatility of crude, and fraction of crude vaporized (Vf); and
    wherein the set of output parameters comprises any or a combination of composition, characteristics, and flow rate of one or more products of the CDU.

3. The system as claimed in claim 2, wherein the thermal property comprises hydrocarbon stream thermal properties selected from heat of vaporization, and specific heat capacity, which is calculated by the processing unit based on the crude specific gravity, and stream draw temperature, and
    wherein the heat balance of the CDU is calculated at real time, and at each of the pre-defined time steps, based on the calculated thermal property and the extracted set of input parameters, which facilitates the processing unit to calculate the volatility of crude, and the fraction of crude vaporized (Vf).

4. The system as claimed in claim 1, wherein when the extracted set of input parameters is beyond a pre-set range of a training data set of the neural network model, the processing unit is configured to adjust one or more hyper parameters associated with the neural network model until the set of output parameters calculated by the processing unit matches real-time value of the set of output parameters of the CDU.

5. The system as claimed in claim 1, wherein the processing unit is configured to adjust one or more hyper parameters associated with the neural network model to train and test the neural network model and the autoregressive exogenous time dependent model, using any or a combination of the extracted set of input parameters, and set of output parameters, and the generated first set of data packets, until the set of output parameters calculated by the processing unit matches real-time value of the set of output parameters in the CDU.

6. The system as claimed in claim 1, wherein the processing unit is configured to determine product stream quality indicators comprising ASTM D86, D1160 distillation points, flash and freeze point, for the predefined time, based on the set of input parameters, and the corresponding set of output parameters received at real-time, and the previous optimal time steps.

7. The system as claimed in claim 1, wherein the processing unit is configured with a set of filters selected from a Savitzky-Golay filter, and a Moving Point Averaging filter to filter and restrict use of the set of inputs parameters having any or a combination of a negative value, zero value, and non-numerical value, in the autoregressive exogenous time dependent model, and
    wherein the processing unit is configured to replace the restricted set of input parameters with another set of input parameters that are mass-energy consistent.

8. The system as claimed in claim 1, wherein the processing unit is operatively coupled to a control unit of the CDU, and wherein the processing unit is configured to transmit a set of control signals to the control unit to adjust the set of input parameters of the CDU based on the determined optimum values of the set of input parameters, to enable the CDU to achieve the corresponding optimal set of output parameters at the predefined time.

9. A method for dynamic optimization of a crude distillation unit (CDU), the method comprising the steps of:
    monitoring, by a set of sensors configured with the CDU and an associated plant, one or more parameters associated with the CDU and the plant, and correspondingly generating a first set of signals;

receiving, by a processing unit configured with a neural network model, the generated first set of signals from the one or more sensors at pre-defined time steps;

extracting, by the processing unit, a set of input parameters, a set of output parameters from the received first set of signals;

calculating, using an autoregressive exogenous time dependent model associated with the processing unit, thermal property, heat balance, and product yield of the CDU for each of the pre-defined time steps, based on the extracted set of input parameters, and correspondingly generating a first set of data packets;

training and testing, the neural network model and the autoregressive exogenous time dependent model, using any or a combination of the extracted set of input parameters, and set of output parameters, and the generated first set of data packets, to determine an optimal value of the pre-defined time steps for subsequent receipt of the first set of signals; and determining, by the processing unit, optimum values of the set of input parameters, and the corresponding output parameters of the CDU for a predefined time, based on the set of input parameters, and the corresponding set of output parameters received at real-time, and the previous optimal time steps.

10. The method as claimed in claim 9, wherein the thermal property comprises hydrocarbon stream thermal properties selected from heat of vaporization, and specific heat capacity, wherein the thermal property is calculated by the processing unit based on crude specific gravity, and stream draw temperature being sensed by the set of sensors, and wherein the heat balance of the CDU is calculated at real time, and at each of the pre-defined time steps, based on the calculated thermal property and the extracted set of input parameters, which facilitates the processing unit in calculating the volatility of crude, and the fraction of crude vaporized (Vf).

11. The method as claimed in claim 9, wherein the method comprises the step of filtering and restricting, by a set of filters selected from a Savitzky-Golay filter, and a Moving Point Averaging filter, the use of the set of inputs parameters having any or a combination of a negative value, zero value, and non-numerical value, in the autoregressive exogenous time dependent model, and wherein the processing unit is configured to replace the restricted set of input parameters with another set of input parameters that are mas-energy consistent.

12. The method as claimed in claim 9, wherein the method comprises the step of adjusting, by the processing unit, one or more hyper parameters associated with the neural network model to train and test the neural network model and the autoregressive exogenous time dependent model, using any or a combination of the extracted set of input parameters, and set of output parameters, and the generated first set of data packets, until the set of output parameters calculated by the processing unit matches real-time value of the set of output parameters in the CDU.

13. The method as claimed in claim 9, wherein when the extracted set of input parameters is beyond a pre-set range of a training data set of the neural network, the method comprises the step of adjusting, by the processing unit, one or more hyper parameters associated with the neural network model until the set of output parameters calculated by the processing unit matches real-time value of the set of output parameters in the CDU.

\* \* \* \* \*